(12) United States Patent
Wang et al.

(10) Patent No.: US 9,098,528 B2
(45) Date of Patent: Aug. 4, 2015

(54) FILE STORAGE SYSTEM AND LOAD DISTRIBUTION METHOD

(75) Inventors: Xiaolin Wang, Odawara (JP); Nobuyuki Saika, Yokosuka (JP)

(73) Assignee: HITACHI, LTD., Toyko (JP)

( * ) Notice: Subject to any disclaimer, the term of this patent is extended or adjusted under 35 U.S.C. 154(b) by 251 days.

(21) Appl. No.: 13/512,533

(22) PCT Filed: May 15, 2012

(86) PCT No.: PCT/JP2012/003173
§ 371 (c)(1),
(2), (4) Date: May 29, 2012

(87) PCT Pub. No.: WO2013/171787
PCT Pub. Date: Nov. 21, 2013

(65) Prior Publication Data
US 2013/0311616 A1    Nov. 21, 2013

(51) Int. Cl.
*G06F 17/30* (2006.01)
*H04L 29/08* (2006.01)
*G06F 9/50* (2006.01)
*G06F 3/06* (2006.01)

(52) U.S. Cl.
CPC .............. *G06F 17/302* (2013.01); *G06F 3/061* (2013.01); *G06F 3/067* (2013.01); *G06F 3/0649* (2013.01); *G06F 9/5077* (2013.01); *G06F 9/5083* (2013.01); *G06F 17/30221* (2013.01); *G06F 17/30233* (2013.01); *H04L 67/148* (2013.01)

(58) Field of Classification Search
CPC .................................................. H04L 67/148
USPC ................ 709/219, 217; 718/1, 105; 707/827
See application file for complete search history.

(56) References Cited

U.S. PATENT DOCUMENTS

| | | | |
|---|---|---|---|
| 8,429,276 B1 * | 4/2013 | Kumar et al. | 709/226 |
| 2006/0129537 A1 * | 6/2006 | Torii et al. | 707/3 |
| 2008/0082977 A1 * | 4/2008 | Araujo et al. | 718/1 |
| 2008/0155214 A1 | 6/2008 | Shitomi | |
| 2009/0043828 A1 | 2/2009 | Shitomi | |
| 2009/0240975 A1 * | 9/2009 | Shitomi et al. | 714/5 |
| 2010/0251253 A1 * | 9/2010 | Pike | 718/104 |
| 2011/0153697 A1 * | 6/2011 | Nickolov et al. | 707/827 |
| 2011/0246430 A1 * | 10/2011 | Prahlad et al. | 707/679 |
| 2012/0011176 A1 | 1/2012 | Aizman | |
| 2012/0016838 A1 | 1/2012 | Arai et al. | |

FOREIGN PATENT DOCUMENTS

WO    2011148496 A1    5/2010

* cited by examiner

*Primary Examiner* — Jerry Dennison
(74) *Attorney, Agent, or Firm* — Volpe and Koenig, P.C.

(57) ABSTRACT

According to the prior art load distribution method, there was a drawback in that the time required from discovery of increase of load to the completion of countermeasures was long. In particular, upon receiving migration of data from other file devices, it was necessary to equalize not only the load accompanying normal processes but also the load accompanying the data migration processes. In a file system receiving migration of data from a plurality of file devices, a plurality of virtual NAS (VNAS) is provided within the file storage subsystem, and an associated VNAS for executing data migration from file devices and accesses from clients is respectively associated with each file storage subsystem. Then, the state of each VNAS is defined based on the state of progress of data migration in the file storage subsystem. According to the defined state, load distribution among VNAS is performed.

14 Claims, 27 Drawing Sheets

Fig. 1
(1) Prior Art
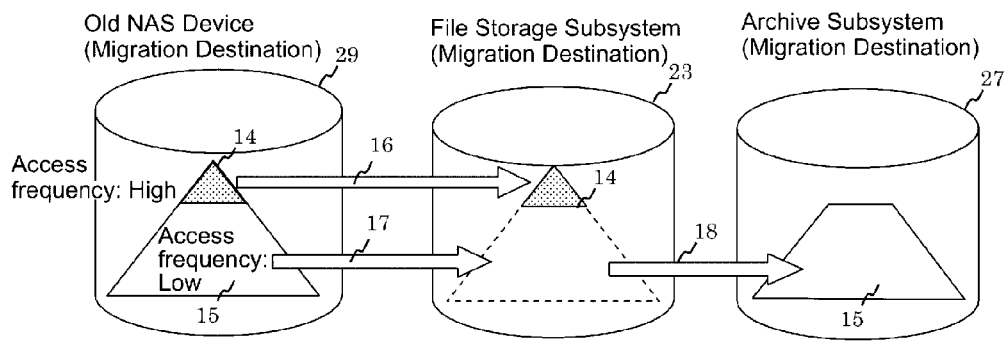
(2) Present Invention
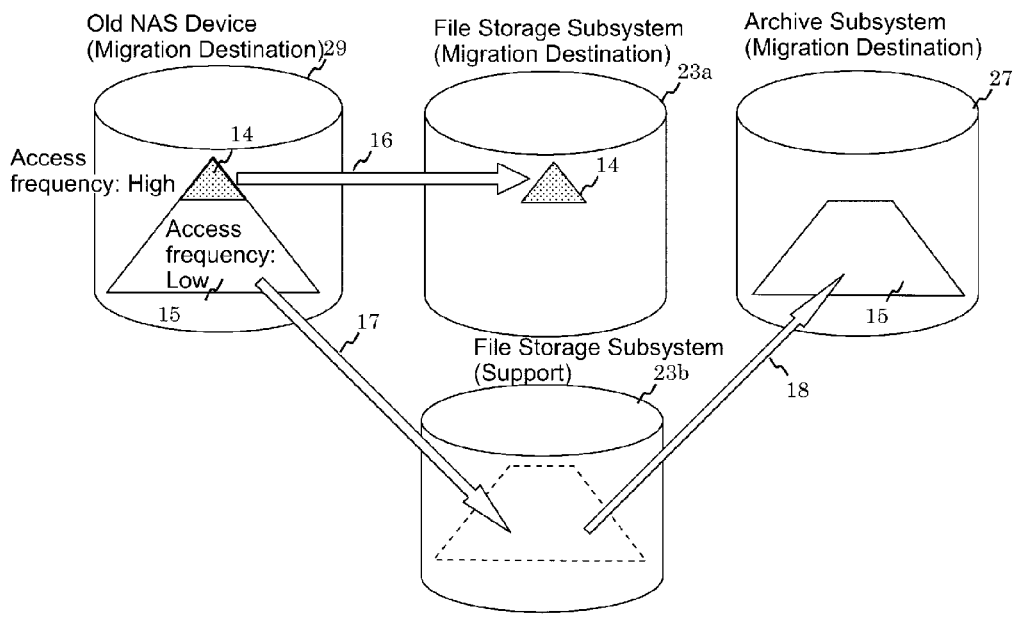

Fig. 9

| Directory Path Name visible to client | IP Address of VNAS in File Storage Subsystem | File Path Name in VNAS |
|---|---|---|
| /share/a.txt | 192.168.1.2 | /dir1/a.txt |
| /share/b.txt | 192.168.1.3 | /dir2/b.txt |

Fig.10

| Directory Path Name | Stubbed Flag | Storage Destination in Archive Subsystem | Block Address |
|---|---|---|---|
| /dir1/a.txt | ON | http://xxx.yy.zzz/a.txt | — |
| /dir2/b.txt | OFF | — | XXXXXXXX |

Fig.12
(1) Replication / Synchronization
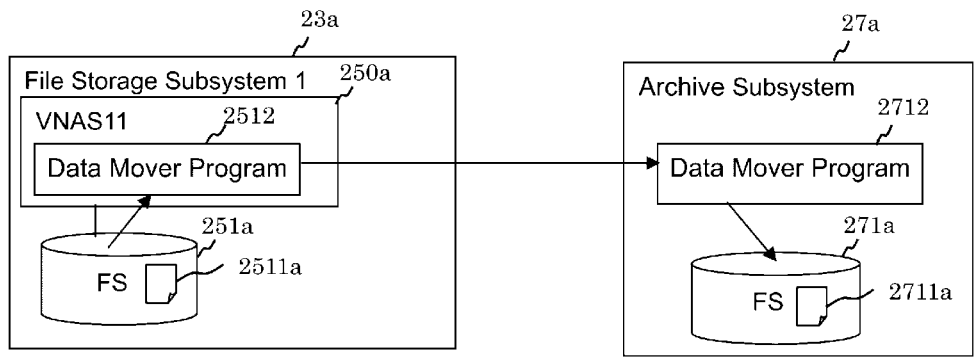
(2) Stubbed
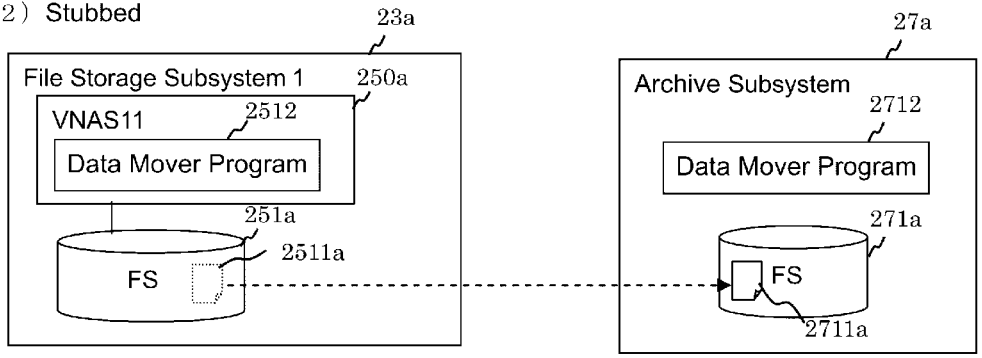
(3) Recall
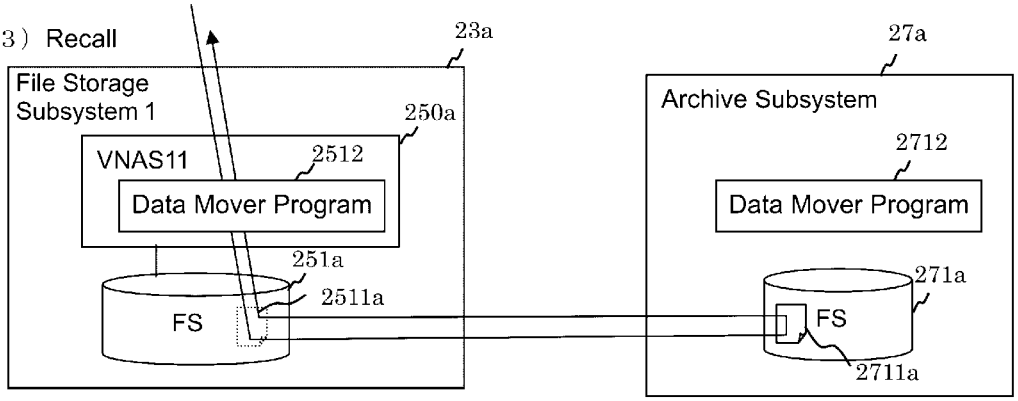

Fig.13C
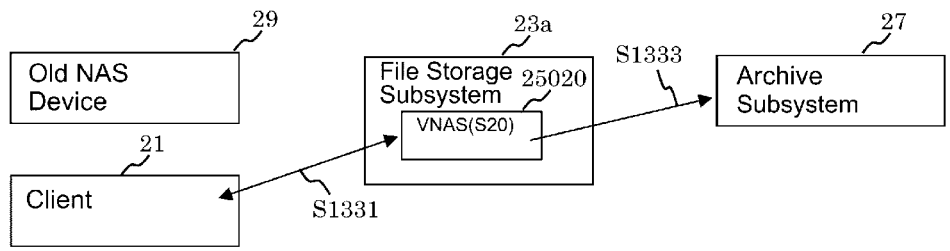
Fig.13D
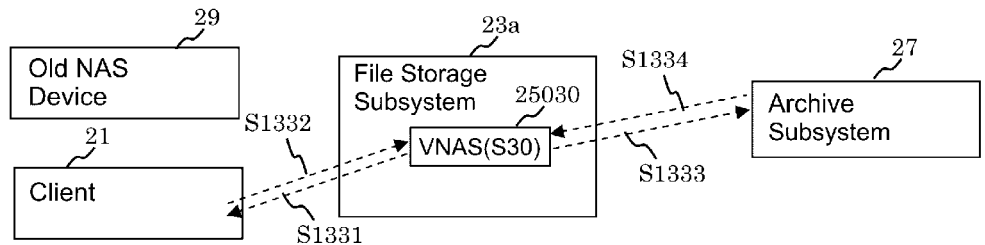
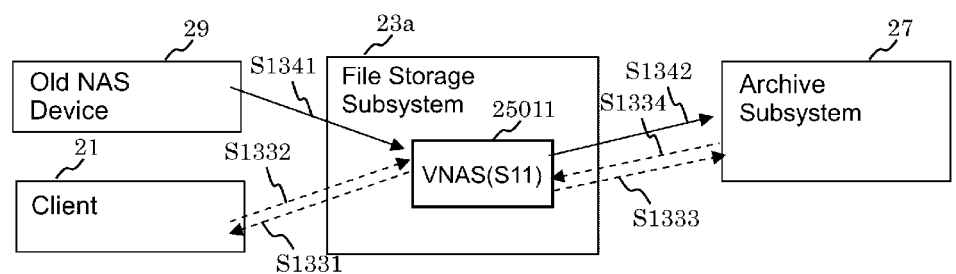

| VNAS-ID | Execution Location | State | Migration Source NAS-ID | Support Destination VNAS-ID | Progress Level | Stubbed rate | Replication / Synchronization Time |
|---|---|---|---|---|---|---|---|
| VNAS-1 | FSA-01 | S10 | NAS-01 | | 35% | 0% | 00:00 |
| VNAS-2 | FSA-02 | S11 | NAS-01 | VNAS-1@FSA-01 | 100% | 50% | 12:00 |
| VNAS-3 | FSA-03 | S20 | | | 100% | 20% | 03:00 , 06:00 |
| VNAS-4 | FSA-04 | S30 | | | 100% | 70% | 08:00 , 20:00 |

1501 1502 1503 1504 1505 1506 1507 1508 150

| # | State | Usable VNAS Spec |
|---|---|---|
| 1 | S10 | L2,L3,L4 |
| 2 | S20 | L2,L3 |
| 3 | S30 | L1 |
| 4 | S11 | L2 |

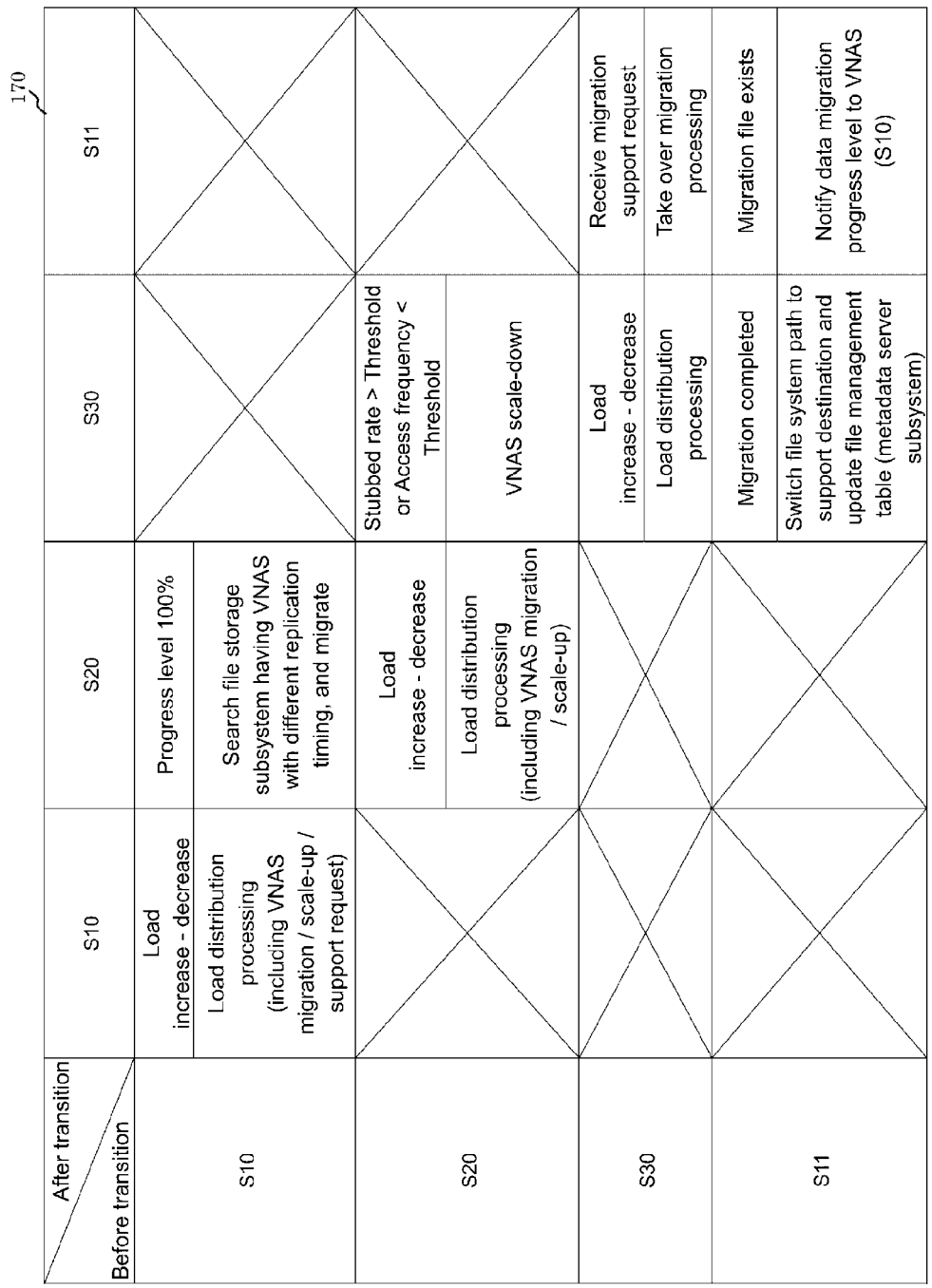

| Before transition \ After transition | S10 | | S20 | | S30 | S11 |
|---|---|---|---|---|---|---|
| | Load increase - decrease | Load distribution processing (including VNAS migration / scale-up / support request) | Progress level 100% | Search file storage subsystem having VNAS with different replication timing, and migrate | | |
| S10 | | | | | | |
| S20 | | | Load increase - decrease | Load distribution processing (including VNAS migration / scale-up) | Stubbed rate > Threshold or Access frequency < Threshold | |
| | | | | | VNAS scale-down | |
| S30 | | | | | Load increase - decrease | Receive migration support request |
| | | | | | Load distribution processing | Take over migration processing |
| | | | | | Migration completed | Migration file exists |
| S11 | | | | | Switch file system path to support destination and update file management table (metadata server subsystem) | Notify data migration progress level to VNAS (S10) |

Fig.20

(1) File Management Table of Metadata Server Subsystem 201

| Directory Path Name visible to client | IP Address of VNAS in File storage subsystem | File path Name in File storage subsystem (Storage Destination of Stubbed Information) |
|---|---|---|
| /share/a.txt | 192.168.1.2 | /dir1/a.txt |
| /share/b.txt | 192.168.1.3 | /dir2/b.txt |
| /share/c.txt | 192.168.1.4 | /dir3/c.txt |

Columns: 2011, 2012, 2013

(2) File Management Table of File storage subsystem 1 (192.168.1.2) 202

| Directory Path Name | Stubbed Flag | Storage Destination in Archive Subsystem | Block Address |
|---|---|---|---|
| /dir1/a.txt | ON | http://xxx.yy.zzz/a.txt | — |
|  |  |  |  |
|  |  |  |  |

Columns: 2021, 2022, 2023, 2024

(3) File Management Table of File storage subsystem 2 (192.168.1.3) 203

| Directory Path Name | Stubbed Flag | Storage Destination in Archive Subsystem | Block Address |
|---|---|---|---|
|  |  |  |  |
| /dir2/b.txt | ON | http://xxx.yy.zzz/b.txt | — |
|  |  |  |  |

Columns: 2021, 2022, 2023, 2024

(4) File Management Table of File storage subsystem 3 (192.168.1.2) 204

| Directory Path Name | Stubbed Flag | Storage Destination in Archive Subsystem | Block Address |
|---|---|---|---|
|  |  |  |  |
|  |  |  |  |
| /dir3/c.txt | ON | http://xxx.yy.zzz/c.txt | — |

Columns: 2021, 2022, 2023, 2024

Fig.23
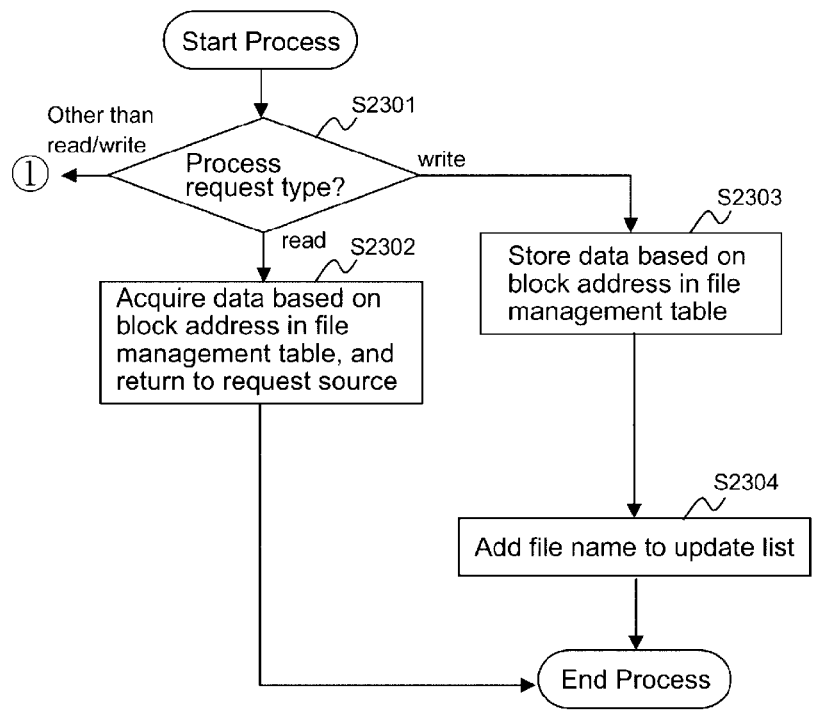
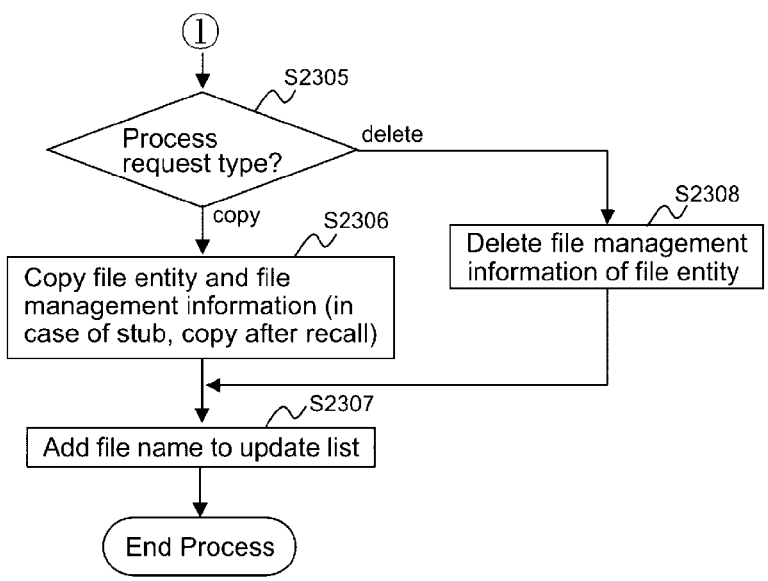

FILE STORAGE SYSTEM AND LOAD DISTRIBUTION METHOD

CROSS REFERENCE TO RELATED APPLICATION

This application claims priority to International Application No. PCT/JP2012/003173, filed May 15, 2012 which is incorporated by reference as if fully set forth.

TECHNICAL FIELD

The present invention relates to a file storage system and a load distribution method.

BACKGROUND ART

Along with the recent advancement of IT, there has been developed an inexpensive NAS file storage subsystem as a storage system capable of receiving file accesses from clients via the network and providing file services.

In a file storage system composed of a file storage subsystem receiving access requests from the clients and an archive subsystem coupled thereto, since only the file data having high access frequencies are stored in the file storage subsystem and other file data having low access frequencies are stored in the archive subsystem, and the file data are accessed via control information of the file storage subsystem, techniques are adopted to perform data migration and data copy among file storage subsystems and archive subsystems. One example of such data migration and data copy technique is illustrated in patent literature 1.

According to such a file storage system, in order to equalize the loads on physical resources within the system, the CPU utilization rate or the like is monitored, and when a file storage subsystem receiving high load is found, processes such as analysis of logs are performed in order to specify the cause of increased load, and thereafter, measures are taken to reduce (equalize) the load, such as changing the file storage destination or increasing the file storage subsystems.

CITATION LIST

Patent Literature

PTL 1: PCT International Publication WO2011/148496 (US Patent Application Publication No. 2012/0016838)

SUMMARY OF INVENTION

Technical Problem

However, according to the aforementioned load distribution method, there was a drawback in that the time required from discovering the increased load to completing measures was too long. Specifically, upon receiving data migration from other file devices, it was necessary to equalize not only the load accompanying normal processes but also the load accompanying the data migration process.

Therefore, the object of the present invention is to reduce the time required from discovering the increase of load to the completion of measures, and to realize rapid load distribution.

Solution to Problem

In a file system receiving data migration from a plurality of old file devices (old NAS devices), a plurality of virtual NAS (Virtual Network Attached Storage, hereinafter abbreviated as VNAS) are provided within the file storage subsystem, and an associated VNAS for executing data migration from the file device (old NAS device) and the access requests from the clients is associated with each file storage subsystem. Then, the state of each VNAS is determined based on the state of progress of data migration in the file storage subsystem. Load distribution among VNAS is performed based on the defined states.

In other words, the present invention focuses on the existence of a pattern in which the relationship between access frequency and number of accessed files forms a pyramid structure within the life cycle of processes related to the data after data migration from a file device occurs, and executes the load distribution processing in VNAS units associated with each data migration.

Advantageous Effects of Invention

The present invention executes load distribution processing in VNAS units associated with each data migration after data migration from the file device has occurred, according to which load distribution can be executed speedily prior to discovering increased loads.

BRIEF DESCRIPTION OF DRAWINGS

FIG. 1 is a conceptual diagram illustrating the outline of a load distribution method according to one embodiment of the present invention.

FIG. 9 is a view showing a configuration example of a file management table in a metadata server subsystem.

FIG. 10 is a view showing a configuration example of a file management table in a file storage subsystem.

FIG. 12 is a view showing a replication/migration operation of the file storage subsystem to a file archive subsystem.

FIG. 13C is a definition diagram of a VNAS state.
FIG. 13D is a definition diagram of a VNAS state.
FIG. 17 is a view showing a configuration example of a VNAS state transition table.

FIG. 20 is a view showing a configuration example of a file management table in a metadata server subsystem and a file storage subsystem.

FIG. 23 is a flowchart showing the operation of file access processing via a reception program of a file storage subsystem.

DESCRIPTION OF EMBODIMENTS

Figure 2:
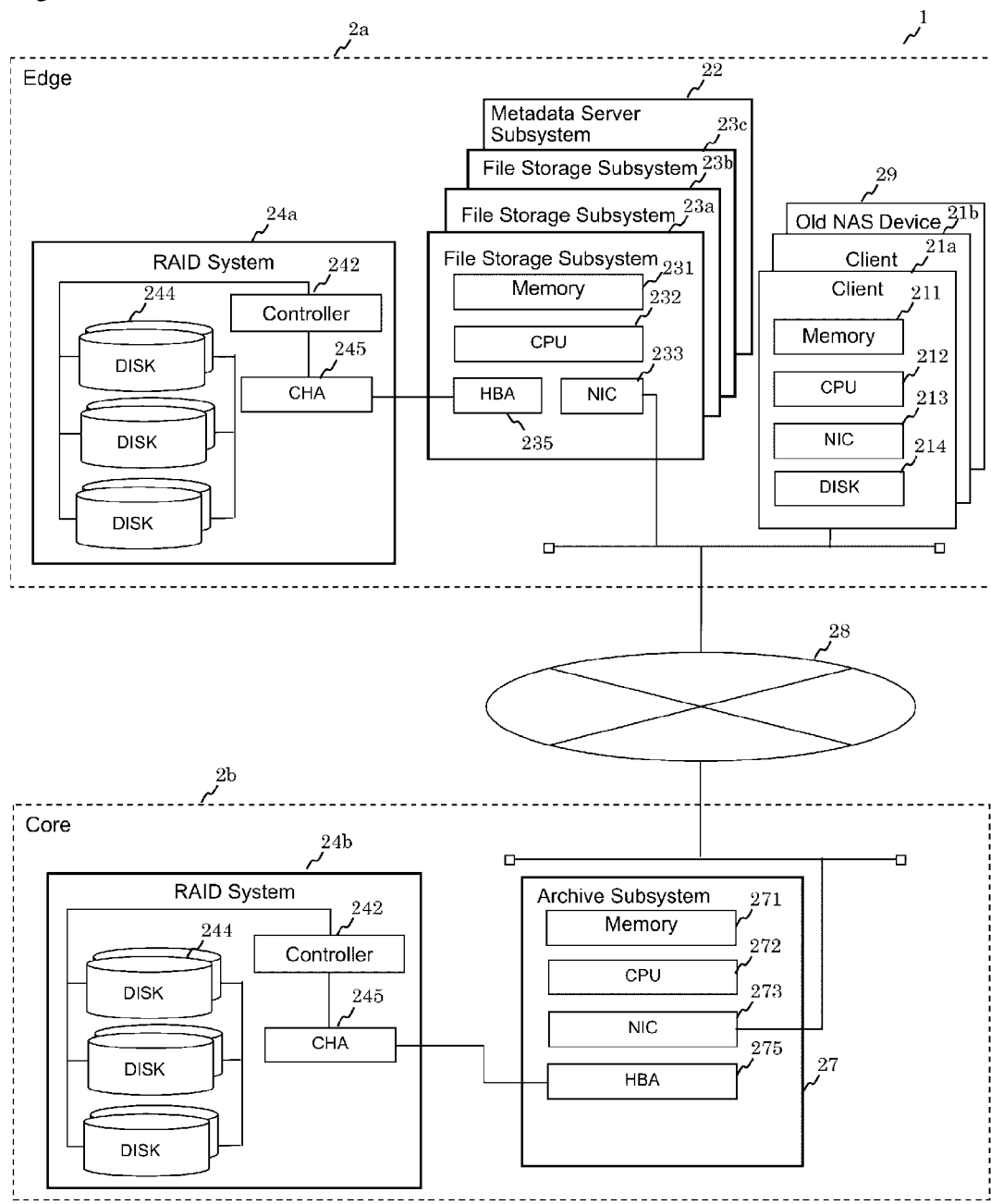
FIG. 2 is a view showing a hardware configuration of the whole storage system according to one embodiment of the present invention.

Now, the preferred embodiments of the present invention will be described with reference to the drawings. In the following description, various information are referred to as "management table" and the like, but the various information can also be expressed by data structures other than tables. Further, the "management table" can also be referred to as "management information" to show that the information does not depend on the data structure.

The processes are sometimes described using the term "program" as the subject. The program is executed by a processor such as an MP (Micro Processor) or a CPU (Central Processing Unit) for performing determined processes. A processor can also be the subject of the processes since the processes are performed using appropriate storage resources (such as memories) and communication interface devices (such as communication ports). The processor can also use dedicated hardware in addition to the CPU. The computer program can be installed to each computer from a program source. The program source can be provided via a program distribution server or storage media, for example.

Each element, such as each LU (Logical Unit), can be identified via numbers, but other types of identification information such as names can be used as long as they are identifiable information. The equivalent elements are denoted with the same reference numbers in the drawings and the description of the present invention, but the present invention is not restricted to the present embodiments, and other modified examples in conformity with the idea of the present invention are included in the technical range of the present invention. The number of each component can be one or more than one unless defined otherwise.

SUMMARY OF THE INVENTION

FIG. 1 is a conceptual diagram illustrating the outline of a load distribution method according to one embodiment of the present invention. The outline of the load distribution method will be described with reference to FIG. 1.

In a file storage subsystem, when multiple users share file data, the characteristics of the load that occurs in the file storage subsystem varies with time.

For example, at a point in time when a new type of file storage subsystem 23 is introduced and file sharing is started to be adopted, the operation is performed while migrating processing 16/17 file data from an old NAS device 29, so that the load of the migration processing of file data to the file storage subsystem will affect the file access performance.

Further, as shown in FIG. 1, the file data managed via the old NAS device 29 is composed of a file data 14 having a high access frequency and a file data 15 having a low access frequency, and the distribution of the files has a pyramid structure (for example, the ratio of file data 14 having a high access frequency is 10 to 20% and the ratio of file data 15 having a low access frequency is 80 to 90%).

Therefore, as shown in the prior art example of FIG. 1 (1), when file data migration is performed without considering the distribution of file data, the processing of access requests from clients to file data having a high access frequency is influenced by the large amount of migration processing of file data having a low access frequency, according to which response (response performance) from the file storage subsystem is deteriorated.

Therefore, according to the present invention illustrated in FIG. 1 (2), the migration processing 16 of the file data 14 having a high access frequency is performed via a file storage subsystem 23a. Although not shown, the file access processing requests from the client is also performed via the file storage subsystem 23a. In other words, the migration processing of the file data 14 having a high access frequency and the file access processing from the client is performed on demand.

On the other hand, the migration processing 17 of the file data 15 having a low access frequency is executed in the background by a different file storage subsystem 23b.

When migration from the old NAS device 29 is completed, the files having a high access frequency are stored in the file storage subsystem 23a, and a new file is also added thereto. Therefore, replication/synchronization processing to an archive subsystem 27 musts also be performed in the state where access load is high due to the increase of file number and the inflow of files having a high access frequency, it becomes necessary to reduce the load of replication/synchronization processing and to reduce the influence to access processing.

Furthermore, in the state where the access frequency has decreased and a large portion of the files have been stubbed (data entity is migrated from the file storage subsystem to the archive subsystem and only the link information to the archive subsystem is stored in the file storage subsystem), if a file search occurs (such as for discovering patterns from past sales data and utilizing the same for marketing), a large amount of recall processing may occur and the load may be increased.

Therefore, according to the present invention, a replication/migration/recall processing of file data 15 having a low access frequency to the archive subsystem 27 is executed via a different file storage subsystem 23b or the like having a different processing timing (time), so as to distribute the load among file storage subsystems.

The actual operation of the above process is performed by providing a plurality of virtual NAS (VNAS) which are virtual machines in each file storage subsystem, and performing load distribution among VNAS including the migration among file storage subsystems based on the load status of each VNAS.

Moreover, load distribution is performed by executing the replication operation or the synchronization operation to the archive subsystem 27 using the VNAS having a different replication timing or synchronization timing after migration of file data from the old NAS device 29 has been completed.

Further, the load includes the migration of file data, a file access request from a client to a file storage subsystem, deleting of duplicated files and data (de-duplication), and condensing operation such as the elimination and consolidation of fragmented file data in the disks of the file storage subsystem. The detailed operation will be described later.

<<Overall System>>

Now, the preferred embodiment of the present invention will be described in detail. If the reference number only includes numerals, it refers to a collective term of components, and if the reference number includes numerals and alphabets, it refers to the individual components.

<Hardware Configuration>

FIG. 2 is a view showing a hardware configuration of the whole storage system according to one embodiment of the present invention.

A storage system 1 includes an edge 2a and a core 2b, and the edge 2a and the core 2b are coupled via a communication network 28 such as a LAN (Local Area Network).

An edge 2a is a base including a local computer system, which is a base in which the user actually conducts business, such as a branch or a business office. Further, a core 2b is a base including a remote computer system, which is a base for providing bases and cloud services for collectively managing servers and storage devices. Further, in the example shown in FIG. 2, only one edge 2a and one core 2b are illustrated, but there can be multiple edges 2a and/or multiple cores 2b.

The edge 2a is composed of a RAID system 24a, file storage subsystems 23a through 23c, clients 21a and 21b, and an old NAS device 29. The file storage subsystem 23 is coupled to the client 21, the old NAS device 29 or the like via a communication network (such as a LAN). Similarly, a metadata server subsystem 22 is also coupled to the client 21, the old NAS device 29 or the like via a communication network such as a LAN.

Furthermore, the file storage subsystem 23 and the metadata server subsystem 22 can be coupled to the RAID system 24a for example via a communication network (such as a SAN (Storage Area Network)).

The RAID system 24a is broadly divided into a controller unit and a storage unit. The controller unit is composed of a controller 242 and a CHA (Channel Adapter) 245.

The storage unit comprises a disk 244. A CHA 245 and a disk 244 are coupled to the controller 242. The CHA 245 is a communication interface unit coupled to file storage subsystems 23a through 23c. The disk 244 is a disk-type physical storage device (such as an HDD (Hard Disk Drive) or an optical disk). Other types of physical storage devices (such as a flash memory device) can be adopted as the physical storage device. Further, one or more RAID groups can be composed of a plurality of disks 244.

Figure 8:
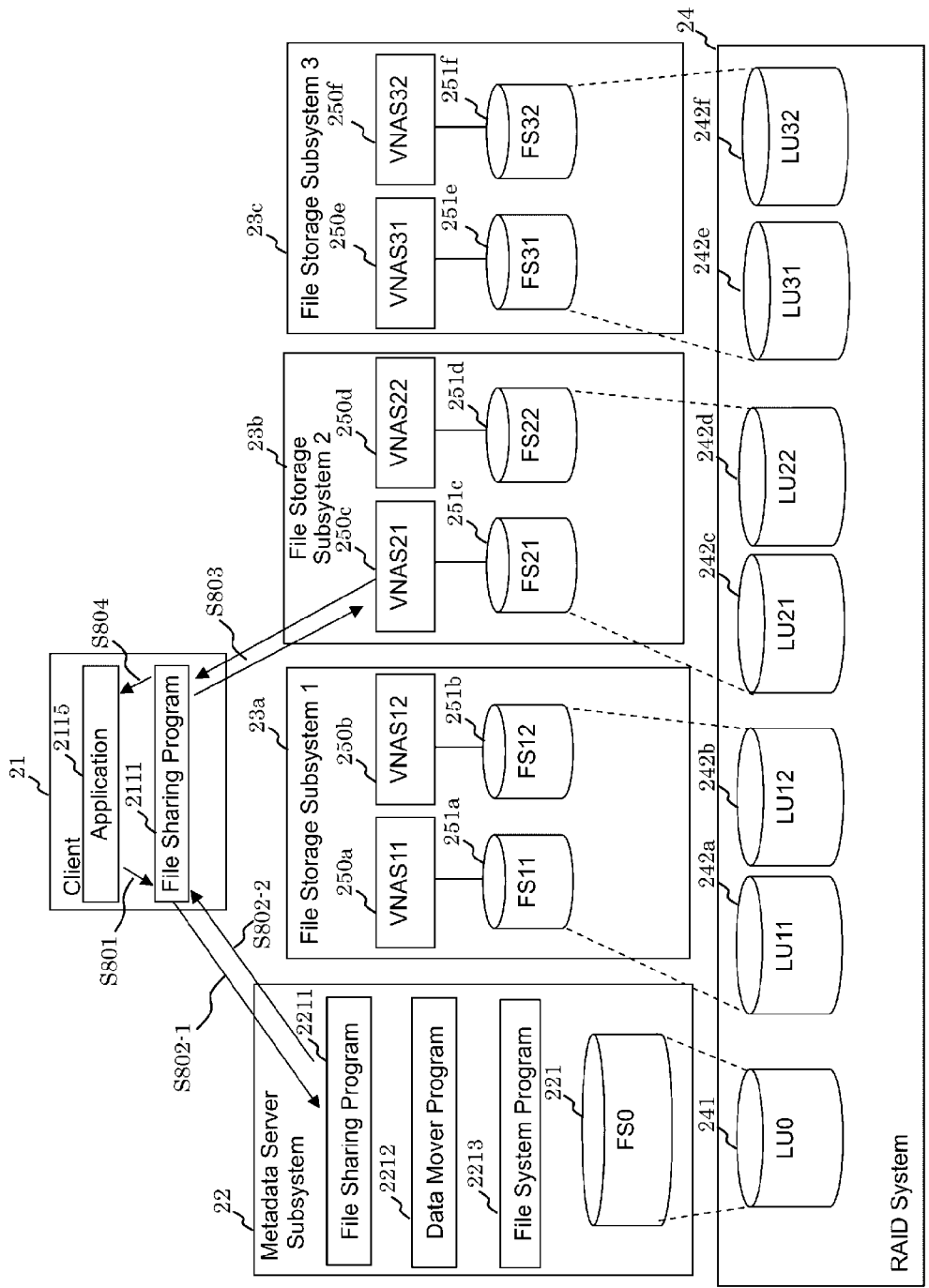
FIG. 8 is a block diagram illustrating a file access operation.

Further, the RAID system 24a comprises a plurality of LUs, as described later (such as FIG. 8). The LU is a logical storage device composed of a plurality of blocks (storage areas), wherein files are stored in the LU. Moreover, it is possible to store in the LU all or a part of the file system information described later.

A RAID system 24a receives a block level I/O request sent from the file storage subsystem 23a via the CHA 245, and based on the control of the controller 242, executes the I/O access to an appropriate disk 244.

The file storage subsystem 23a is composed of a memory 231, a CPU (Central Processing Unit) 232, an NIC (Network Interface Card) 233, and an HBA (Host Bus Adapter) 235. The CPU 232 is coupled to the memory 231, the NIC 233 and the HBA 235. The NIC 233 is a communication interface device for communicating with the archive subsystem 27, clients 21a and 23b and the old NAS device 29. The HBA 235 is a communication interface device for communicating with the RAID system 24a.

The memory 231 is a storage area (such as a RAM (Random Access Memory) or a ROM (Read Only Memory)) that the CPU 232 is capable of reading and writing directly. The file storage subsystem 23a reads a program (such as an OS (Operating System)) for controlling the file storage subsystem 23a into the memory 231 and causes the CPU 232 to execute the program. The file storage subsystem 23a can have other types of storage resources in addition to or in place of the memory 231.

For example, the file storage subsystem 23a receives via the NIC 233 a file-level I/O access request from the client 21a. The file storage subsystem 23a creates an I/O access request (block-level I/O access request) for I/O of the data block constituting the file designated by the I/O request. The file storage subsystem 23a transmits the block-level I/O access request via the HBA 235 to the RAID system 24a. The file storage subsystems 23b and 23c have a similar internal configuration as the file storage subsystem 23a.

The internal configuration of a metadata server subsystem 22 is not illustrated, but it adopts a similar configuration as the file storage subsystem 23a.

The client 21a comprises a memory 211, a CPU 212, an NIC 213 and a disk 214. The client 21a can have other types of storage resources in addition to or in place of the memory 211 and/or the disk 214. The client 21a is a PC (Personal Computer), a server or a host computer, but it can also be a smartphone or a multifunction portable terminal.

The client 21a can read the program (program such as an OS for controlling the client 21) stored in the disk 214 into the memory 211, and cause the CPU 212 to execute the program. Further, the client 21a sends the file level I/O access request via the NIC 213 to the file storage subsystem 23a. The client 21b adopts a similar configuration as the client 21a and executes a similar operation.

The internal configuration of the old NAS device 29 is not illustrated, but it adopts a similar configuration as the client 21a. In the state where the file sharing function is started to be used, the storage system 1 has the file data on the disk of the old NAS device 29 migrated to file storage subsystems 23a through 23c.

A core 2b is equipped with a RAID system 24b and an archive subsystem 27. The RAID system 24b is coupled to the archive subsystem 27.

The configuration of the RAID system 24b of core 2b is similar to the configuration of the RAID system 24a of the edge 2a. Accordingly, the RAID system 24b also receives the block level I/O access request sent from the archive subsystem 27 via the CHA 245, and executes an I/O access to an appropriate disk 244 based on the control of the controller 242. It is possible that the configuration of the RAID system 24b of the core 2b differs from the configuration of the RAID system 24a of the edge 2a.

The archive subsystem 27 is equipped with a memory 271, a CPU 272, an NIC 273 and an HBA 275. Other types of storage resources can be provided in place of or in addition to the memory 271. The archive subsystem 27 reads the program (such as the OS) for controlling the archive subsystem 27 into the memory 271, and causes the CPU 272 to execute the program. Further, the archive subsystem 27 communicates with the file storage subsystem 23a or the like via the NIC 273 and the communication network 28. The archive subsystem 27 is coupled via the HBA 275 and performs accesses in block units.

<Software Configuration>

Figure 3:
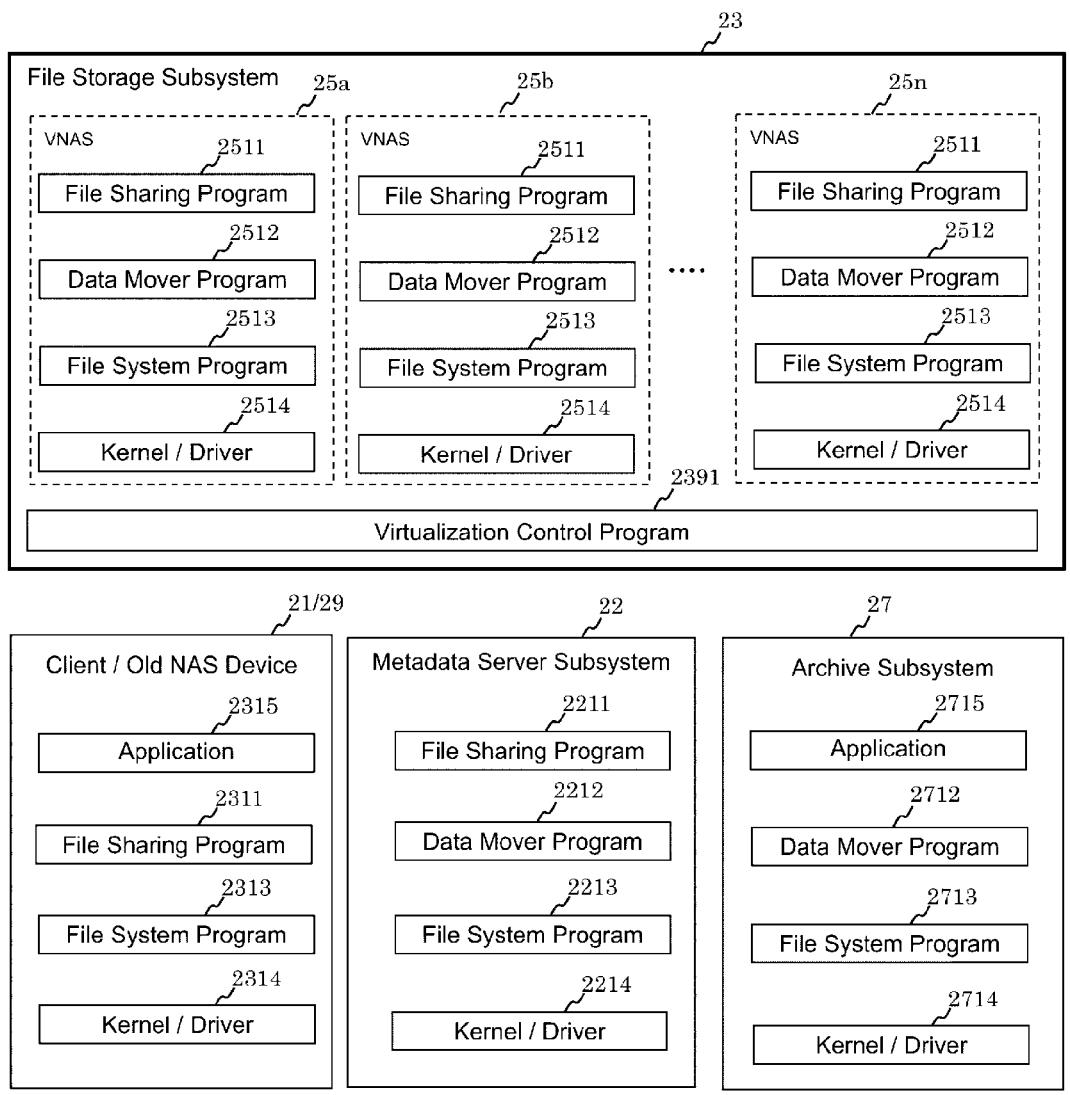
FIG. 3 is a view showing a software configuration of the whole storage system according to one embodiment of the present invention.

FIG. 3 is a view showing a software configuration of the overall storage system according to one embodiment of the present invention. In the present example, the respective file storage subsystems are not distinguished, but are collectively referred to as file storage subsystem 23. The client is also referred to as client 21.

VNAS 25a, 25b . . . 25n of the file storage subsystem 23 each stores a file sharing program 2511, a data mover program 2512, a file system program 2513 and a kernel/driver 2514.

Further, a virtualization control program 2391 is stored in a memory 231 of the file storage subsystem 23. A virtualization control program 2391 is a program for providing a virtual volume to a client or for operating a virtual NAS machine (VNAS).

An application 2315, a file sharing program 2311, a file system program 2313 and a kernel/driver 2314 are stored in the memory of the client 21 and the old NAS device 29.

A file sharing program 2211, a data mover program 2212, a file system program 2213 and a kernel/driver 2214 are stored in the memory of the metadata server subsystem 22.

An application 2715, a data mover program 2712, a file system program 2713 and a kernel/driver 2714 are stored in the memory 271 of the archive subsystem 27.

The file sharing programs 2511, 2311 and 2211 are programs providing a file sharing service among clients and hosts using a communication protocol such as a CIFS (Common Internet File System) or an NFS (Network File System).

The data mover programs 2512, 2212 and 2712 are programs for executing migration of file data among file storage subsystems 23 or among file storage subsystems 23 and archive subsystems 27. The data mover program 2212 of the metadata server subsystem functions as the control source to order migration of the above-mentioned file data.

In the following description, the data mover program 2512 within the file storage subsystem 23 is called a "local mover", the data mover program 2712 within the archive subsystem 27 is called a "remote remover", and if the programs are not specifically distinguished, they are referred to as a "data mover program".

The local mover 2512 reads the file data being the target of replication from the LU of the RAID system 24a of the edge 2a, and transfers the file data to the archive subsystem 27.

The remote mover 2712 receives the replication target file data from the file storage subsystem 23 and writes the file data to the LU of the RAID system 24b of the core 2b.

The kernel/driver 2514 is a program for performing general control operation and control operation unique to the hardware, such as controlling the schedule of multiple programs (processes) operating in the file storage subsystem 23, the client 21 and the metadata server subsystem 22 or handling the interruption requested from the hardware. The kernel/drivers 2214, 2314 and 2714 are composed similarly as the kernel/driver 2514.

The application programs 2315 and 2715 are a software (program) used by the client 21 or the archive subsystem 27 in response to the object of the operation.

A file system (FS) 40 is a logic structure constructed to realize files as management units in a physical volume (LU). The program for managing the same is called a file system program, wherein file system programs 2513, 2313, 2213 and 2713 of FIG. 3 correspond to this program.

Figure 4:
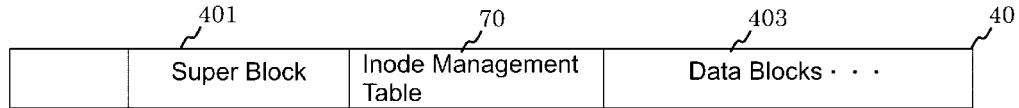
FIG. 4 is a view showing a configuration example of a file system structure.

FIG. 4 is a view illustrating a configuration example of a file system structure. Moreover, the file system 40 is composed for example of a super block 401, an inode management table 70 and data blocks 403, as illustrated in FIG. 4.

The super block 401 collectively retains information on the file system 40, and stores the management information of the whole file system 40 including the size of the file system 40 and the free space of the file system 40.

Figure 5:
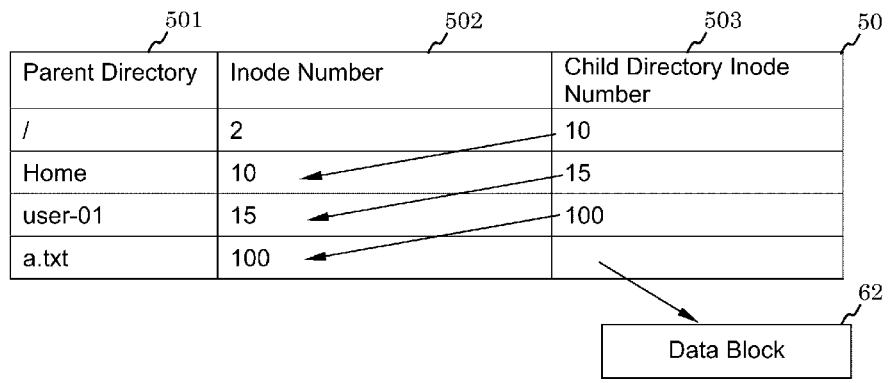
FIG. 5 is a view showing a configuration example of an inode.
Figure 6:
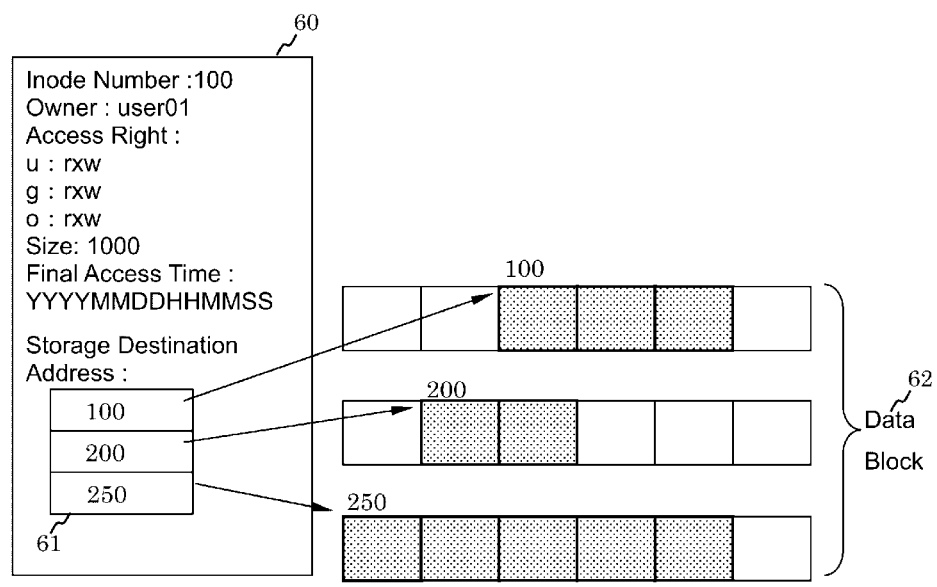
FIG. 6 is a view showing the reference relationship between the inode and data blocks.
Figure 7:
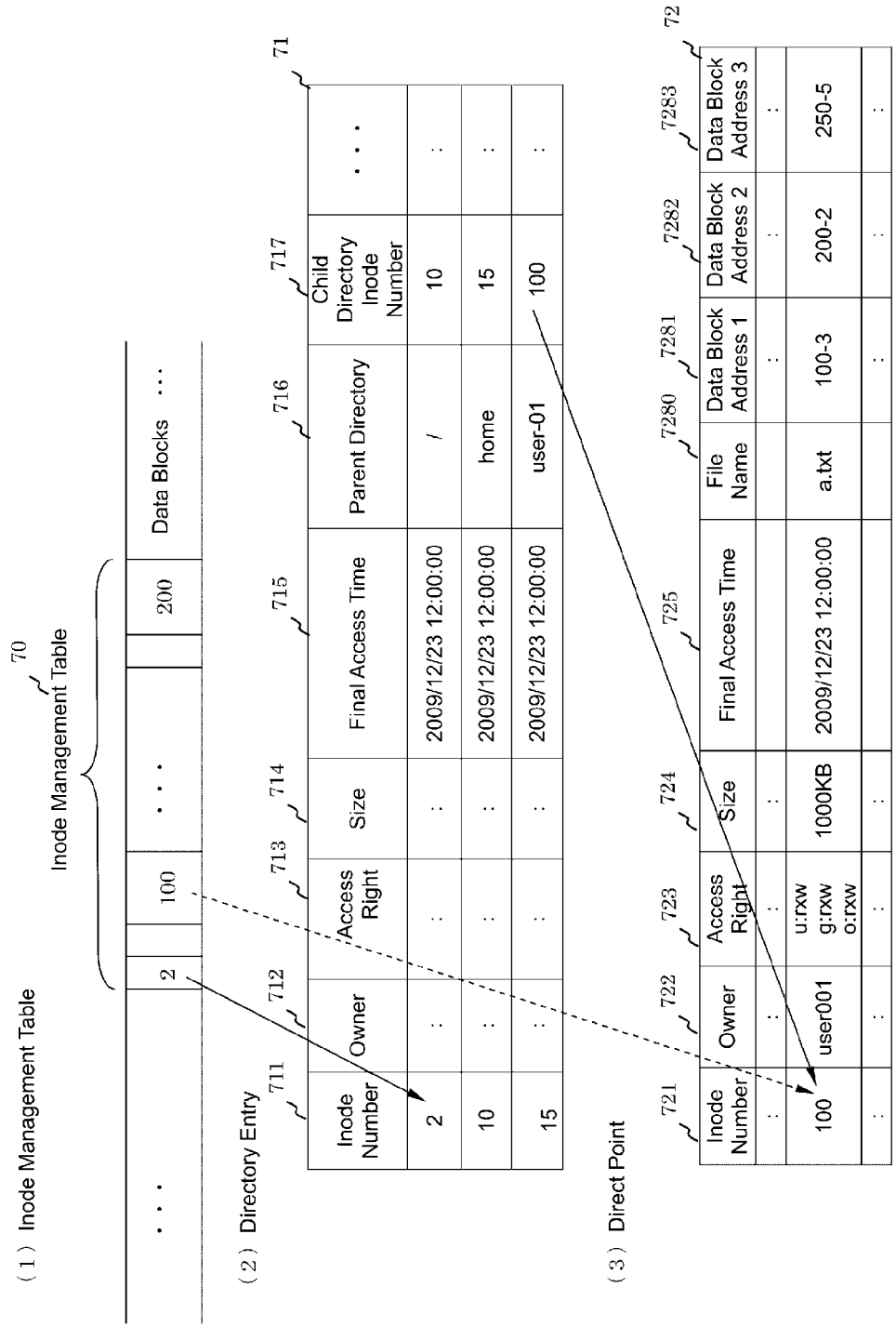
FIG. 7 is a view showing a configuration example of an inode management table.

FIG. 5 is a view showing a configuration example of an inode 60. FIG. 6 is a view showing the reference relationship between the inode 60 and data blocks 62. FIG. 7 is a view showing a configuration example of an inode management table 70.

In the file system 40, management is performed by having a single inode correspond to a single directory or single file, and an entry including only directory information is called a directory entry.

In order to follow a file path, this directory entry is used to access the inode in which the file is stored.

For example, in order to follow /home/user-01/a.txt, as shown in FIG. 5, the inode number 502 and a child directory inode number 503 are followed from "2" to "10", "10" to "15", and "15" to "100" so as to access data block 62.

Furthermore, the inode storing the entity of the file, in other words, "a.txt", retains information such as the owner of the file, the access right, the file size, the final access date and time, the data storage position (storage destination address 61) and so on, as shown in FIG. 6. In the access right of FIG. 6, "u" represents "user", "g" represents "group", "o" represents "other (other than user)", "r" represents "read", "x" represents "execute", and "w" represents "write".

For example, according to inode 60 of inode number "100", the file is composed of data stored in the following blocks (blocks within the LU) as shown in FIG. 6.

(a1) Data in three continuous blocks having address 100 block as the leading block.

(a2) Data in two continuous blocks having address 200 block as the leading block.

(a3) Data in five continuous blocks having address 250 block as the leading block.

Further, the inode 60 is stored in the inode management table 70, as illustrated in FIG. 7. The types of the inode management table 70 are, in addition to the aforementioned directory entry structures (FIGS. 7 (2) and 7 (3)), a file direct point structure directly indicating the inode number of the file data (FIG. 7 (3)).

The inode management table 71 is composed of, as mentioned earlier, an inode number 711, an owner 712, an access right 713, a file size 714, a final access data and time 715, a parent directory 716, a child directory inode number 717, and so on, wherein by following the inode number 711 and the child directory inode number 717, it becomes possible to specify a given file data.

The inode management table 72 is composed of a file name 7280 and data block addresses 7281 through 7283, in addition to an inode number 721, an owner 722, an access right 723, a file size 724 and a final access date and time 725.

<Process Flow>

<File Access>

Next, the process executed according to the present embodiment will be described. FIG. 8 is a block diagram illustrating a file access operation. The system configuration of FIG. 8 constitutes the storage system of a single metadata server subsystem 22, a plurality of file storage subsystems 23 and a client 21.

Further, a plurality of VNAS (virtual NAS) is executed in each file storage subsystem 23, and the load distribution thereof is managed in VNAS units.

The merit of performing load distribution processing in VNAS units is as described below, wherein not only the load distribution by migrating the VNAS but also the reuse of resource of the migrated VNAS is enabled.

(m1) When migrating the VNAS (after stopping the VNAS and restarting the same at the migration destination), the specifications of the VNAS (number of virtual CPUs and virtual memory size) can be changed to realize scale-up (increase of the number of virtual CPUs being used or the reinforcement of virtual memory capacity) of the VNAS possibly receiving high loads.

(m2) In contrast, it also becomes possible to perform scale-down (reduction of the number of virtual CPUs being used or the reduction of virtual memory capacity) of the VNAS having a small frequency of use.

Each VNAS 250a through 250f respectively manage file systems FS11 251a through FS32 251f. Moreover, the file systems FS11 251a through FS32 251f of file storage subsystems 23a through 23c manage the files of the LU11 242a through LU32 242f in the RAID system 24. The same applies to the metadata server subsystem 22. Although not shown, it is possible to provide a VNAS in the metadata server subsystem 22.

Hereafter, the flow of the processes will be described with the program set as the subject, but the substantive components executing the processes are the CPU of the client 21, the file storage subsystem 23 and the metadata server subsystem 22 and the controller of the RAID system 24. The reference sign Sx in the drawing is an abbreviation of step x (x being an integer of 1 or more).

At first, an access request from an application program 2115 operating in the client 21 to a certain file occurs in the file sharing program 2111 (S801).

The file sharing program 2111 of the client 21 sends a file access request to a file sharing program 2211 of the metadata server subsystem 22 (S802-1).

The metadata server subsystem 22 having received the file access request refers to the inode management table 70 of FS0 221, and returns a storage destination of the access target file data to the file sharing program 2111 of the client 21 (S802-2).

The file sharing program 2111 performs reading/writing of data in the file storage subsystem 23 (file storage subsystem 23b in FIG. 8) in which the file is stored based on the response result (S803). Actually, the VNAS 21 250c having received the access request reads and stores the file data.

Lastly, the file sharing program 2111 sends to the application program 2115 a predetermined data or access complete notice (S804).

FIG. 9 is a view showing a configuration example of a file management table of a metadata server subsystem. FIG. 10 shows a configuration example of a file management table of a file storage subsystem.

When a file access request to /share/a.txt is received from the client 21, for example, the metadata server subsystem 22 returns an IP address 902 ("192.168.1.2") of the VNAS of the file storage subsystem 23 in which the file is actually stored and a file path name 903 within the VNAS ("/dir1/a.txt") to the client 21 based on the file management table 90. The client 21 specifies the file storage subsystem 23b via the received IP address 902.

The storage destination (device such as the RAID system 24 or the archive subsystem 27, the storage directory or the storage block address) is specified based on the file management table 100 and the above-mentioned file path name 903 within the VNAS of the specified file storage subsystem 23b. Since according to the /share/a.txt file, a stubbed flag 1002 of the file management table 100 is "ON", so that the entity of the file does not exist in the file storage subsystem 23b. Only the link information (storage destination 1003 in the archive subsystem) to the archive subsystem 27 storing the entity of the file exists in the file storage subsystem 23b. Therefore, the VNAS 21 250c executes a recall processing mentioned later and acquires the entity of the file data from the archive subsystem 27.

Moreover, since the /share/b.txt file has the stubbed flag 1002 of the file management table 100 set to "OFF", that the file is not stubbed, and the entity of the file data exists in the data block shown by the block address 1004 of the file storage subsystem.

<Data Migration>

Figure 11:
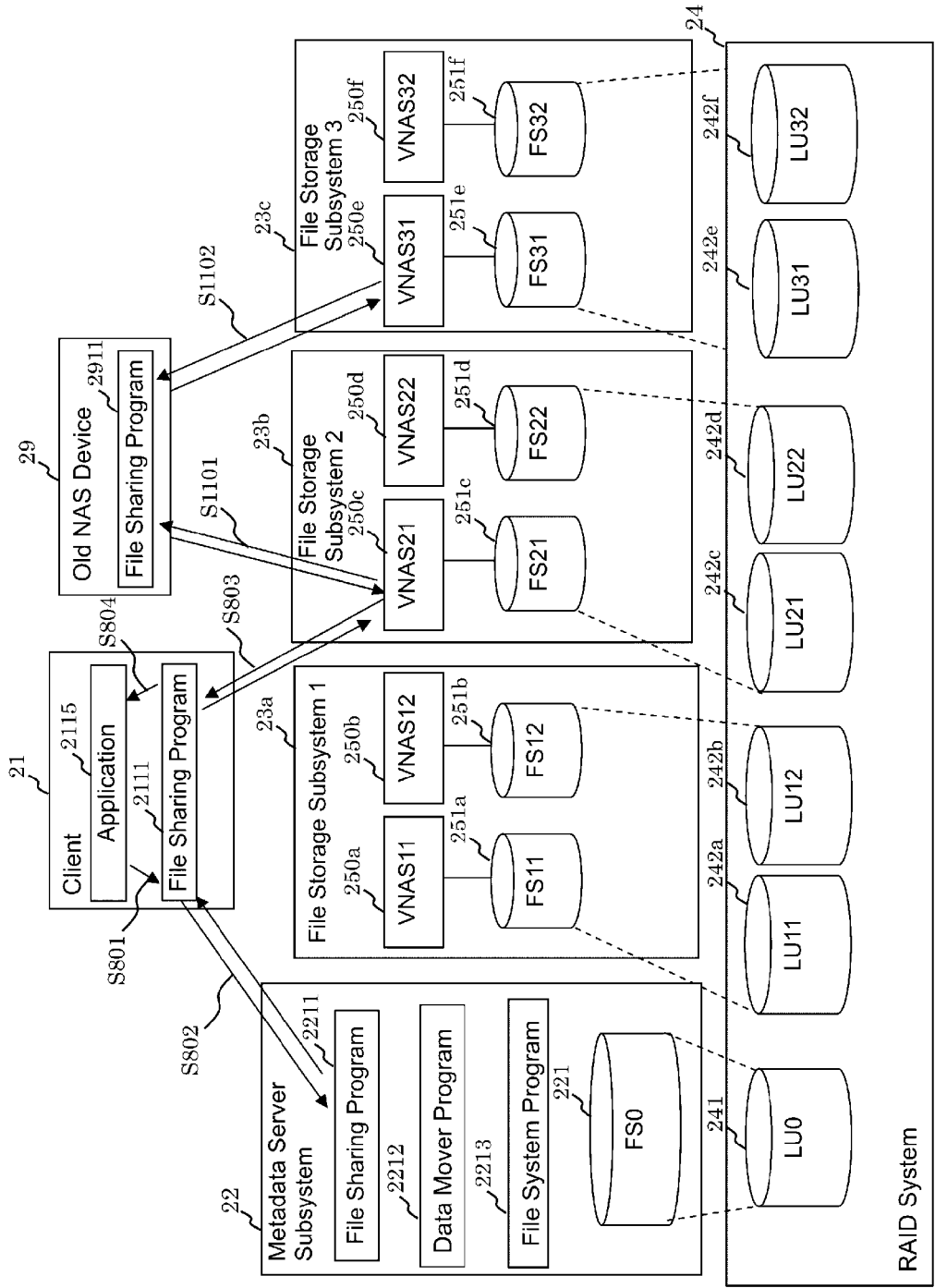
FIG. 11 is a view showing a data migration operation from an old NAS device to a file storage subsystem.

FIG. 11 is a view showing an operation for migrating data from an old NAS device to a file storage subsystem. The migration of file data stored in the old NAS device 29 to the file storage subsystem is performed when an access occurs from the client 21 (S1101) or performed in the background (S1102).

The data migration (S1101) triggered by the access requests from the client 21 is executed by the VNAS21 250c at the time of access from the client 21 to the file storage subsystem 23b when a certain file data only exists in the old NAS device 29.

Further, according to the example in which the migration is performed in the background (S1102), the VNAS31 250e performs data migration of the file data in the old NAS device 29 to the file storage subsystem 23c in the background. The detailed operation will be described later.

<Replication/Migration>

FIG. 12 is a view showing a replication/migration operation of the files in the file storage subsystem to the archive subsystem.

<Replication/Synchronization>

According to the present replication processing and synchronization processing, the replication target files are shared among the edge 2a side and the core 2b side.

At first, the local mover 2512 receives a replication request. The source from which the replication request is issued or the timing in which the replication request is issued is not specifically restricted. The replication request includes, at least, an identification information (such as a file name) of the replication target file.

Next, the local mover 2512 requests the archive subsystem 27a to allocate a storage area of the replication target file 2511a. The archive subsystem 27a (remote mover 2712) allocates a storage area of the storage destination of the replication target file based on the storage area allocation request.

Thereby, the archive subsystem 27a (remote mover 2712) sends to the local mover 2512 an identification information of the replication target file 2511a and a link destination information (information showing the allocated storage area) which is the information on the storage destination of the replication target file 2511a.

Next, the local mover 2512 receives a link destination information (such as a URL) of the replication target file 2511a from the archive subsystem 27a (remote mover 2712), and adds the received link destination information to the inode management table 100 of FS 251a.

Next, the local mover 2512 reads the replication target file 2511a specified based on the replication request from the FS 251a (actually, the LU of the RAID system 24).

Thereafter, the local mover 2512 transfers the replication target file 2511a being read to the remote mover 2712. Next, the remote mover 2712 writes the received replication target file 2511a as a file 2711a to a location FS 271a (actually, the LU of the RAID system 24) based on the link destination information.

Further, if the file 2511a having completed replication has been updated, every time update is performed, synchronization processing, that is, a process to match the contents of the file 2511a in the file storage subsystem 23a with the contents of the file 2711a of the archive subsystem 27a, is executed.

<Stubbing>

The file having a low access frequency is subjected to stubbing, which is a process for deleting the data entity from the file storage subsystem 23a and replacing the same with a link information (such as a URL) to the archive subsystem 27a.

The local mover 2512 deletes a replicated file (strictly speaking, the entity thereof) when a certain condition is fulfilled (such as when the final access time becomes old or the access interval becomes long), and thereby realizes a substantial migration of the replicated file. The file having been stubbed has a stubbed flag 1002 in the file management table 100 of the file storage subsystem turned to "ON", and the storage destination information is stored in a storage destination 1003 of the archive subsystem.

<Recall>

If the local mover 2512 receives a read request from a client 21 or the like to a stub of a deleted file (metadata) after stubbing has been performed, the local mover acquires the file data linked to the stub via the remote mover 2712 and sends the acquired file data to the client 21. This process is called a recall processing.

In the recall processing, the local mover 2512 specifies the file storage subsystem storing the link information via the file management table 90 of the metadata server subsystem 22. The local mover 2512 specifies the storage destination 1003 in the archive subsystem 27 in which the entity of the file data is stored via the file management table 100 of the file storage subsystem. The remote mover 2712 reads the specified file data and sends the same to the local mover 2512.

<<VNAS>>

<Definition of States>

FIGS. 13A through 13D are views defining the VNAS states. In the present embodiment, the following four VNAS states (S10, S11, S20 and S30) are defined. The character "S" of state Sx is an abbreviation of the term state. Further, the VNAS of each status is shown as VNAS (Sx).

(a) S10: VNAS (S10) 25010

After newly creating a VNAS, the state of executing the on-demand migration of file data and the background migration of file data from the old NAS device 29, and receiving file access from the client is defined as S10. That is, the VNAS is in a state executing the following three processes:

(1) Processing the File Access Request from the Client 21 to the File Storage Subsystem 23a (S1301).

(2) Performing on-demand migration of the file having a high access frequency in the old NAS device to the file storage subsystem 23a (S1302).

(3) Migrating the file having a low access frequency in the old NAS device 29 to the file storage subsystem 23a (S1303-1), and performing migration to the archive subsystem 27 on the background (S1303-2).

(b) S11: VNAS (S11) 25011

The state of VNAS supporting (substituting) migration of file data of VNAS (VNAS (S10)) in which the state is S10 is referred to as S11. That is, the migration processing of a file having a low access frequency (S1303-1 and S1303-2) is executed by VNAS (S11) 25011 of the file storage subsystem 23b.

Figure 13A:
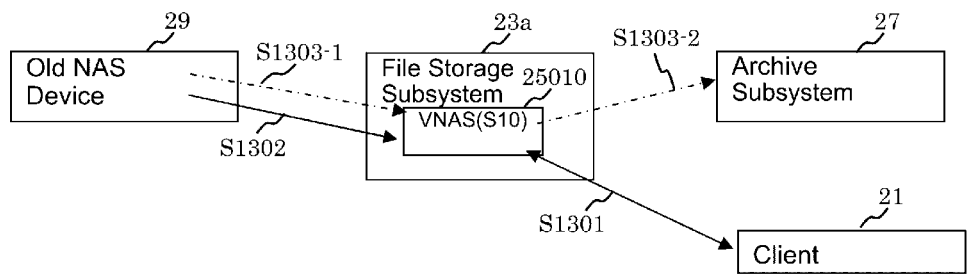
FIG. 13A is a definition diagram of a VNAS state.
Figure 13B:
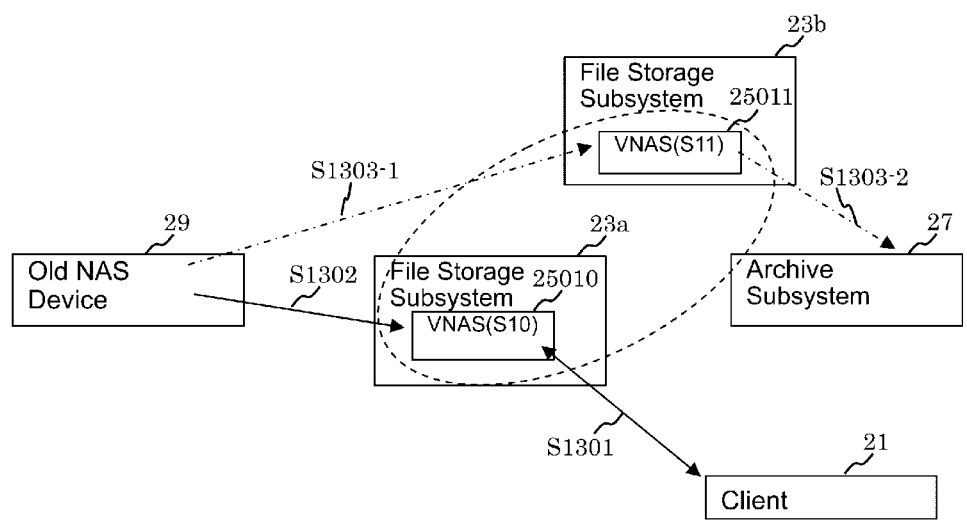
FIG. 13B is a definition diagram of a VNAS state.

Further, in the following description, the group of VNAS (S10) and VNAS (S11) having the same data migration source is called a VNAS group (VNAS surrounded by the dotted line of FIG. 13B).

Even further, the progress of migration of file data from the old NAS device 29 is defined by (number of files migrated in the VNAS group)/number of migration target files, which is referred to as progress level. The progress level can also be defined by (capacity of files migrated in the VNAS group)/ migration target file capacity.

(c) S20: VNAS (S20) 25020

The state of VNAS in state S10 having completed data migration from the old NAS device 29 (progress level 100%) and mainly processing file accesses (S1331) from the client 21 is referred to as S20. The VNAS (S20) in the present state performs replication processing to the aforementioned archive subsystem 27, synchronization processing and file stubbing process (S1333).

(d) S30: VNAS (S30) 25030

The state of VNAS in state S20 in which the access frequency is reduced and stubbing of the file is advanced is referred to as S30. The VNAS (S30) 25030 can support background migration of the VNAS (S10) 25010 (having a small access frequency and capable of migrating file data (S1341) to the archive subsystem 27).

Further, if the requested file from the client 21 does not exist in the file storage subsystem 23 but exists in the archive subsystem 27, the execution of the aforementioned recall processing of the file (S1334) is performed by the VNAS (S30).

At the time point of state S30, the VNAS (S30) 25030 itself does not support the VNAS in other states. If a support request is output from the VNAS (S10) 25010, the own status of the VNAS is changed from S30 to S11 and becomes VNAS (S11), and the VNAS substitutes and supports the migration of file data having a low access frequency that has been executed by the VNAS (S10).

<Transition of State>

Figures 14, 15, 16:
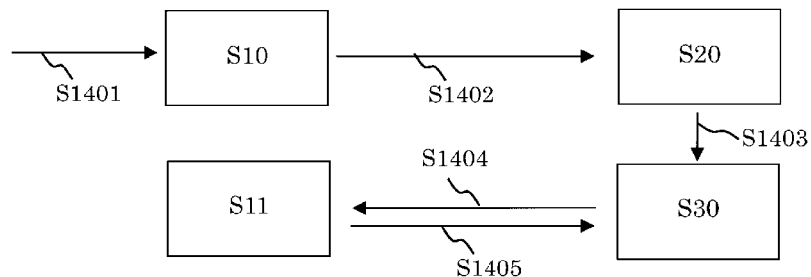
FIG. 14 is a view showing the transition of state of VNAS.
FIG. 15 is a view showing a configuration example of a VNAS management table.
FIG. 16 is a view showing a configuration example of a VNAS spec policy table.

FIG. 14 is a view showing the state of transition of VNAS. FIG. 15 is a view showing a configuration example of a VNAS management table. FIG. 16 is a view showing a configuration example of a VNAS spec policy table. The operation of status transition of VNAS will now be described with reference to FIGS. 14 through 16.

As shown in FIG. 14, when file data migration is started after creating the VNAS, the VNAS state becomes S10 (VNAS (S10)) (S1401).

Next, when file data migration is progressed and the progress level of file data migration becomes 100%, the VNAS state becomes S20 (VNAS (S20)) (S1402).

The VNAS (S20) performs replication processing for replicating a file to the aforementioned archive subsystem 27, a synchronization processing and a file stubbing process. The VNAS computes a stubbed rate STB (number of stubbed files/total number of files) and monitors the access frequency IOPH. Moreover, the stubbed rate STB can be computed by dividing the capacity of stubbed files by the total file capacity.

When the stubbed rate STB has exceeded a predetermined threshold SB_th1 or when the access frequency IOPH has fallen below a predetermined threshold IO_th1, the VNAS state is transited from S20 (VNAS (S20)) to S30 (VNAS (S30)) (S1403).

As described, the VNAS (S30) becomes VNAS (S11) when a request to support of file data migration is received from the VNAS (S10), and supports data migration of the file having a low access frequency to be migrated to the archive subsystem 27 (S1404).

This VNAS (S11) returns to VNAS (S30) when the progress level of the migration of file data (in the present case, the total of the progress level performed by the VNAS (S10) of the supporting destination and the VNAS (S11) of the supporting source) becomes 100%.

A VNAS management table 150 of FIG. 15 manages the VNAS state. The VNAS management table 150 is composed of a VNAS-ID 1501, a VNAS execution location 1502, a VANS state 1503, a migration source NAS-ID 1504, a supporting destination VNAS-ID 1505, a progress level 1506, a stubbed rate 1507, and a replication/synchronization time 1508.

The VNAS execution location 1502 is an ID for uniquely specifying the file storage subsystem. The progress level 1506 is a total of the progress level performed by the VNAS (S10) of the support destination and that performed by the VNAS (S11) of the support source, as mentioned earlier.

In the case of VNAS (S10), the migration source NAS-ID 1504 is the ID of the migration source old NAS device, and in the case of VNAS (S11), the ID is the ID of the old NAS device performing data migration of the VNAS (S10) of the support destination. Further, when the state of VNAS is S20 or S30, the migration of file data is completed, so that the migrate destination is blank.

The specification of the VNAS is defined by the combination of the number of virtual CPUs and virtual memory size, and the specification of the usable VNAS of each state is also defined.

For example, if the number of virtual CPUs capable of being used by a single VNAS is 1 to 4 and the virtual memory sizes are 2 to 8 GB, the defined levels are (level, number of virtual CPUs, virtual memory)=(L1, 1, 2), (L2, 2, 4), (L3, 3, 6) and (L4, 4, 8).

In level L1, the number of virtual CPUs is 1 and the size of the virtual memory is 2 GB, whereas in level L4, the number of virtual CPUs is 4 and the size of the virtual memory is 8 GB. Based on these specifications, the VNAS executes processes such as data migration and file access requests.

Further, purposes of the respective VNAS states are considered, which are defined in the VNAS spec policy table of FIG. 16. Since VNAS (S10) performing file data migration processing and processing of file access requests from clients receives a high load, it is capable of selecting a specification of level L2 or higher, to the highest level L4. In contrast, the specification of the VNAS (S30) having completed file data migration and which is in a state where the stubbed rate is high or a state where access frequency to files is low is only capable of selecting level L1.

<Load Distribution Processing>

Figure 18A:
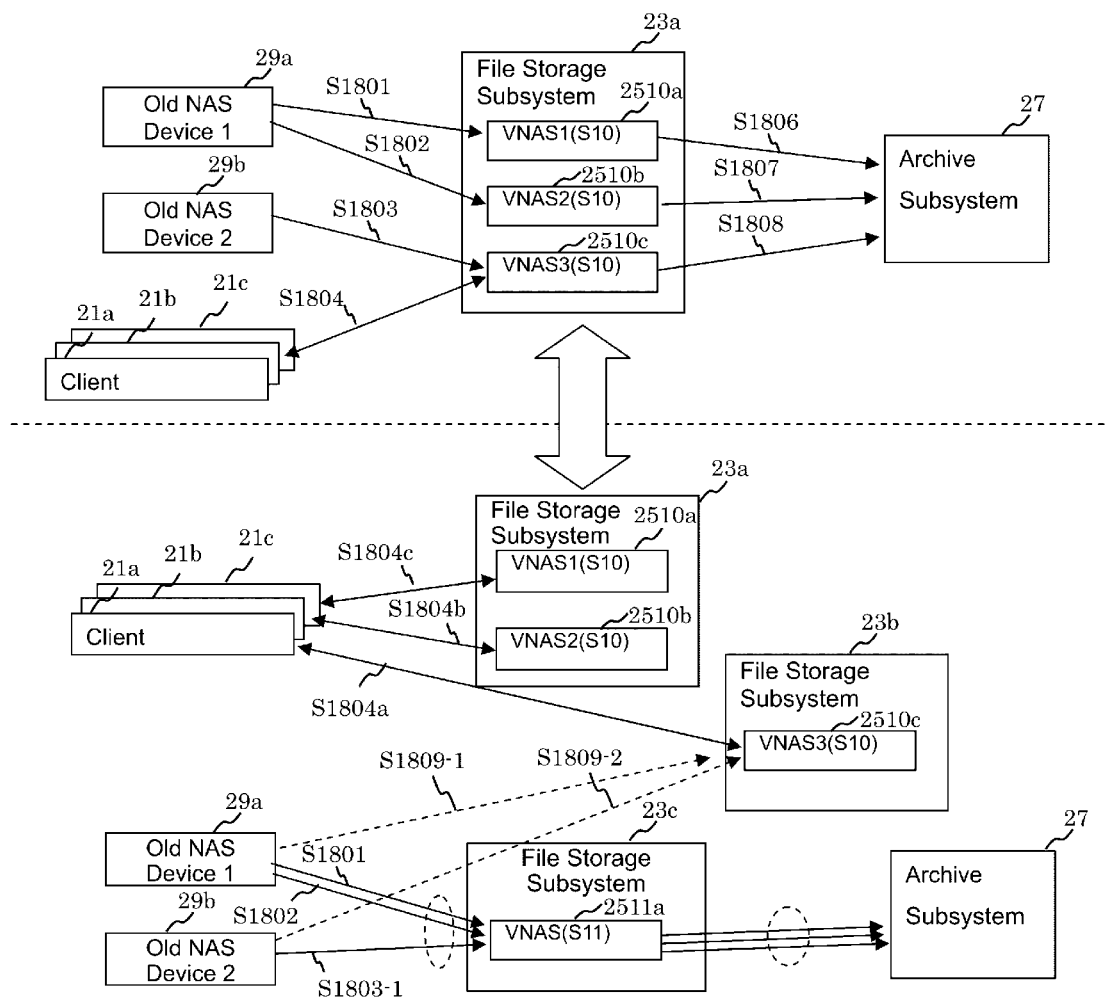
FIG. 18A is a view showing a load distribution processing of VNAS in state S10.
Figure 18B:
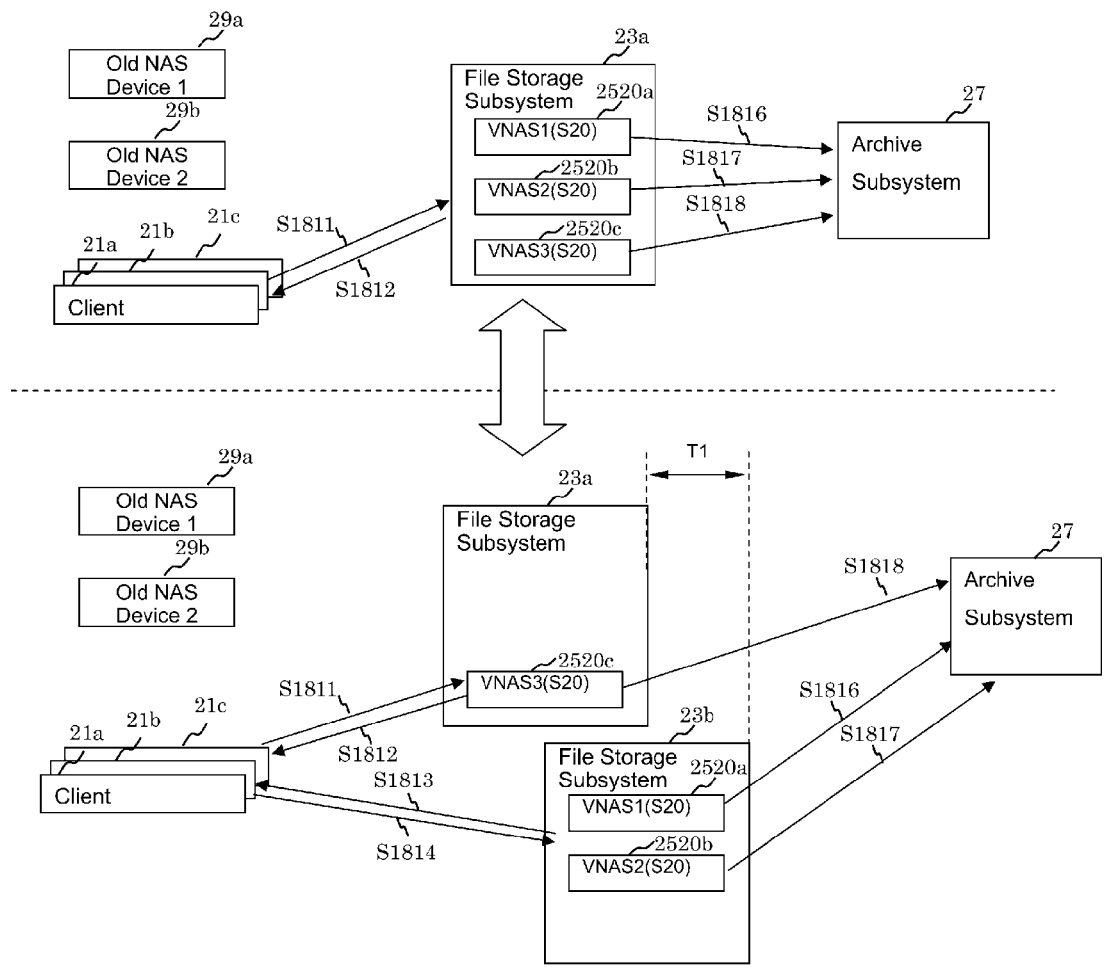
FIG. 18B is a view showing a load distribution processing of VNAS in state S20.
Figure 18C:
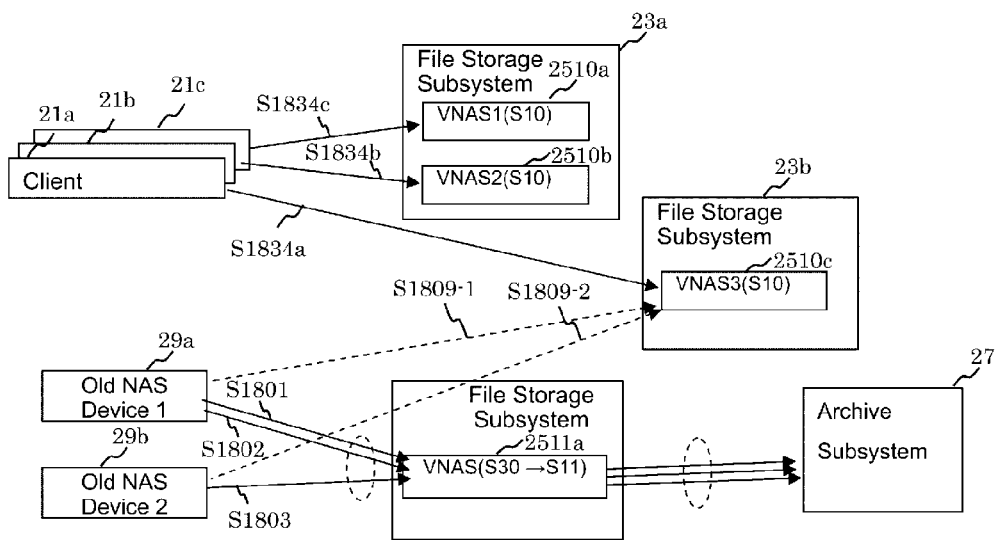
FIG. 18C is a view showing a load distribution processing of VNAS in state S30.
Figure 18D:
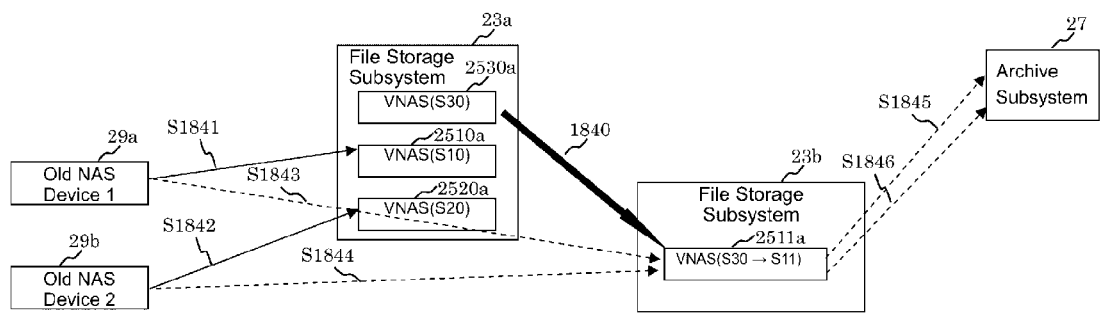
FIG. 18D is a view showing a load distribution support processing of VNAS in state S11.

FIG. 17 is a view showing a configuration example of a VNAS state transition table. FIG. 18A is a view showing a load distribution processing of a VNAS in state S10. FIG. 18B is a view showing a load distribution processing of VNAS in state S20. FIG. 18C is a view showing a load distribution processing of VNAS in state S30. FIG. 18D is a view showing a load distribution support processing of VNAS in state S11.

The actual load distribution processing will be described with reference to FIGS. 17 to 18D.

(1) STEP-1: Monitor Event

The events occurring in VNAS (or the file storage subsystem) (such as the increase and decrease of load, the progress of file data migration, and the reception of migration support request) are monitored, according to which the states of the VNAS are updated and necessary processes are executed. This process is illustrated the VNAS state transition table 170 of FIG. 17. The vertical axis direction of the VNAS state transition table 170 shows the VNAS state before transition, and the horizontal axis direction shows the VNAS state after transition. Further, the upper stages of the cells at the intersection of the vertical and horizontal axes show transition occasions (events), and the lower stages of the cells show the processes being executed. FIG. 17 summarizes the aforementioned state transition of VNAS (FIG. 14) in a table.

For example, if the state before transition and after transition is both S10, load distribution processing performed by migrating the VNAS or requesting support to VNAS (S30) or scale-up processing in which the specification level is enhanced is executed. The scale-up or the scale-down (lowering of specification level) of the VNAS is performed by temporarily stopping the VNAS and restarting the VNAS again after changing the specification. Moreover, the field in which the state before transition and the state after transition are the same represents the "load distribution method" described later.

Next, the actual operation of load distribution processing will be described.

(2) STEP-2: Load Distribution Processing According to Each VNAS State

In each file storage subsystem, the CPU or the virtual CPU of the VNAS or the program operating in the CPU monitors the load on each VNAS or the load on the whole file storage subsystem. When the load exceeds a certain value, the VNAS executes load distribution processing corresponding to each VNAS state based on the classification of STEP-1 (VNAS state transition table of FIG. 17).

(a) VNAS (S10) (FIG. 18A)

The upper half of 18A illustrates the state before load distribution, and the lower half illustrates the state after load distribution. Before load distribution, the VNAS 1 (S10) 2510a within the file storage subsystem 23a executes file data migration (S1801, S1806) from the old NAS device 29a to the archive subsystem 27. Similarly, VNAS2 (S10) 2510b executes file data migration (S1802, S1807) from the old NAS device 29a to the archive subsystem 27. The VNAS3 (S10) 2510C processes the file access request (S1804) from the clients 21a, 21b and 21c in addition to the file data migration (S1803, S1808) from the old NAS device 29b to the archive subsystem 27.

Therefore, the load of the VNAS3 (S10) 2510c is high, and the load of the whole file storage subsystem 23a is also high. Further, scale-up of each VANS cannot be expected.

Therefore, the following dispersion processing is performed to efficiently execute various processes such as data migration and file access processing.

(1) The VNAS3 (S10) 2510c which is a high load VNAS is migrated from the file storage subsystem 23a to the file storage subsystem 23b. By this migration, the resource of VNAS3 (S10) 2510c can be used by VNAS1 (S10) 2510a and VNAS2 (S10) 2510b.

(2) A support request is output to VNAS (S30) of the file storage subsystem 23c.

(3) Clients 21a, 21b and 21c are subjected to dispersion processing via VNAS1 (S10) 2510a, VNAS2 (S10) 2510b and VNAS3 (S10) 2510c.

(4) VNAS1 (S10) 2510a, VNAS2 (S10) 2510b and VNAS3 (S10) 2510c are subjected to scale-up (for example, the level is raised from "L2" to "L3" or "L4" according to the VNAS spec policy table 160).

In the load distribution processing of VNAS (S10), it is possible to select not all the processes (1) through (4) but one or more of the processes.

The state of the lower half of FIG. 18A is realized after executing dispersion processing. Further, the file data having a high access frequency in the old NAS devices 29a and 29b are executed by the VNAS3 (S10) 2510c migrated to the file storage subsystem 23b (dotted line arrows S1809-1 and S1809-2). The area surrounded by the dotted line represents the migration of file data having a low access frequency, wherein the migration is capable of being temporarily stopped and resumed repeatedly. As described, the performance of load dispersion and access processing can be improved by having the processes that have been performed by a single file storage subsystem by a plurality of file storage subsystems.

(b) VNAS (S20) (FIG. 18B)

The upper half of FIG. 18B illustrates the state prior to load dispersion, and the lower half thereof illustrates the state after load dispersion. According to the state prior to load dispersion, the migration of file data from old NAS devices 29a and 29b is completed, the state of the VNAS is changed from S10 to S20, and the file access request from the client 21, the replication processing to the archive subsystem 27 and the synchronization processing are executed.

Along with the elapse of time, the replication or migration of file data having a low access frequency (S1816 to S1818) increases, so that the load on VNAS (S20) 2520a to VNAS (S20) 2520c and the whole file storage subsystem 23a increases. Therefore, the possibility of the processing of the file access request (S1811 and S1812) from the client 21 being influenced increases.

Therefore, a portion of VNAS (S20) is migrated to a file storage subsystem 23 having a different replication timing. That is, the VNAS (S20) 2520b and the VNAS (S20) 2520c is migrated from the file storage subsystem 23a to the file storage subsystem 23b having a replication timing that differs by time T1, so as to enable dispersion of the replication processing (S1816 and S1817), and the file access requests from the client (S1813 and S1814) are processed by a plurality of file storage subsystems to realize load dispersion. As described, the load dispersion and access processing performance can be enhanced by performing the processes that had been performed by a single file storage subsystem by a plurality of file storage subsystems.

(c) VNAS (S30) (FIG. 18C)

The VNAS (S30) takes over the data migration processing performed in the background of files having a low access frequency from the VNAS (S10) in state S10. Further, since migration of files having a low access frequency can be temporarily stopped and resumed again, so that when the load of background processing is increased, the load can be reduced by temporarily stopping and resuming the process. Thus, by having a VNAS of another file storage subsystem substitute execution of the data migration processing, it becomes possible to improve the performance of load distribution and access processing.

(d) VNAS (S11) (FIG. 18D)

The VNAS (S30) periodically monitors the other VNAS operating in the file storage subsystem. If VNAS (S10) or VNAS (S20) in states other than state S30 are increased, the VNAS (S30) searches a file storage subsystem capable of achieving a specification equivalent to or greater than its own specification (L1). If a file storage subsystem capable of realizing an equivalent specification is found, the VNAS (S30) migrates itself to that file storage subsystem. In other words, the VNAS (S30) 2530a detects that the access requests from clients to VNAS (S10) 2510a or VNAS (S20) 2520a are increased. Then, the VNAS (S30) 2530a migrates itself from the file storage subsystem 23a to the file storage subsystem 23b. After migration, the own state of VNAS (S30) 2530a is changed to S11 (VNAS (S11) 2511a).

As described, by migrating the VNAS while the state of the VNAS is still in state S30 which is a state prior to being changed to S11, load distribution can be realized by executing the processes via a plurality of file storage subsystems. Furthermore, since the VNAS can be subjected to scale-up (from L1 of VNAS (S30) to L2 of VNAS (S11)) in the migration destination file storage subsystem, the processing performance can be enhanced. In addition, it becomes possible to subject the VNAS (S10) 2510a or the VNAS (S20) 2520a of the migration source file storage subsystem to scale-up using the resource of the migrated VNAS (S30) 2530a.

(e) Load Distribution of Recall Processing

Figure 19:
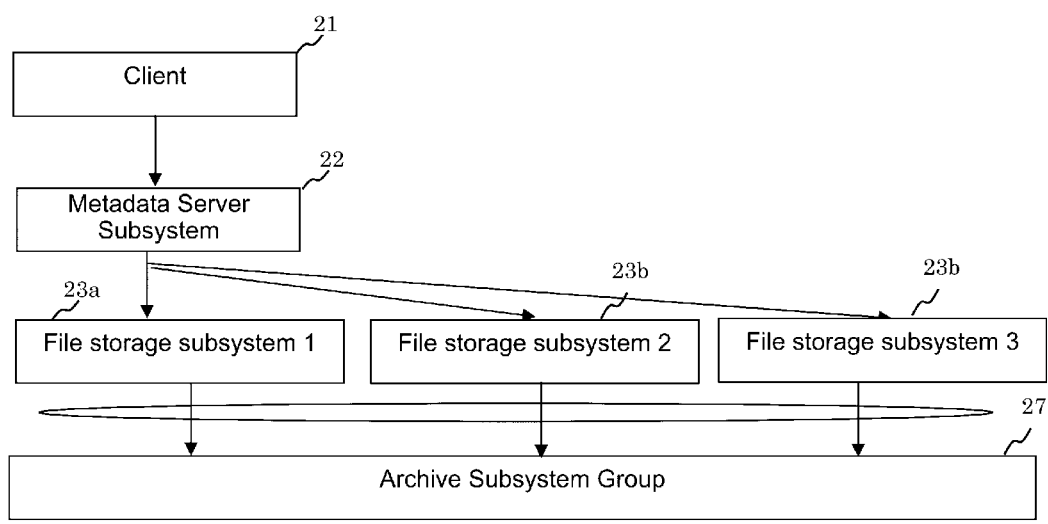
FIG. 19 is a view showing a load distribution of recall processing.

FIG. 19 is a view illustrating the load distribution of recall processing. FIG. 20 is a view showing a configuration example of a file management table of a metadata server subsystem and a file storage subsystem.

When file search occurs in the state where access frequency is reduced and a large portion of the files are stubbed (such as when there is a demand to find patterns from past sales data to be utilized for marketing), a large amount of recall processing occurs and the load may possibly be increased, as mentioned earlier. The load distribution of such recall processing will now be described.

As shown in FIG. 19, if there are multiple stubbed files within a single directory visible from the client 21, they are respectively arranged in different file storage subsystems to realize load distribution of the recall processing. In that case, the stubbed files are located in file storage subsystems 23a through 23c so that the number or capacity of stubbed files are substantially equivalent, and the link information to the archive subsystem 27 is stored.

That is, as shown in file management table 201 of the metadata server subsystem 27, the directory path names 2011 visible to the client "/share/a.txt", "/share/b.txt" and "/share/c.txt" are respectively managed so that the file path names in the file storage subsystems (storage destination of stubbed information) 2013 having IP addresses 2012 "192.168.1.2", "192.168.1.3" and "192.168.1.4" are "/dir1/a.txt", "/dir1/b.txt" and "/dir1/c.txt", as shown in FIG. 20 (1).

As shown in FIGS. 20 (2) through 20 (4), each file storage subsystem has the above-mentioned file path name 2021, has the stubbed flag 2022 set to "ON" and manages the storage destination 2023 in the archive subsystem 27.

According to such distribution allocation of stubbed files and the management thereof, it becomes possible to prevent concentration of recall processing to stubbed files in a specific file storage subsystem, and to enhance load distribution and processing performance.

<<Process Flow in Program/VNAS>>

Next, the flow of processes per program and the flow of processes per VNAS will be described with reference to the flowcharts of FIGS. 21 through 29.

<File Sharing Program>

Figure 21:
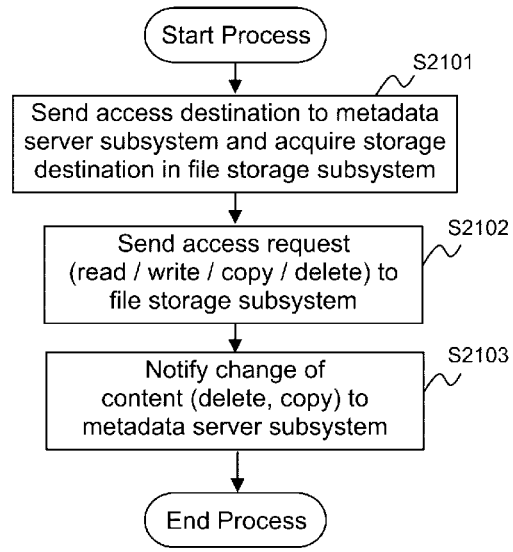
FIG. 21 is a flowchart view showing an operation of file access processing via a file sharing program of a client.

FIG. 21 is a flowchart showing the operation of file access processing in a file sharing program of the client.

In S2101, the file sharing program 2511 of the client 21 sends the access destination to the metadata server subsystem 22, and acquires the storage destination in the file storage subsystem 23.

In S2102, the file sharing program 2511 sends an access request (read/write/copy/delete) to the file storage subsystem 23.

In S2103, the file sharing program 2511 notifies the changed content (delete/copy) to the metadata server subsystem 22.

<Reception Program of Metadata Server Subsystem>

Figure 22:
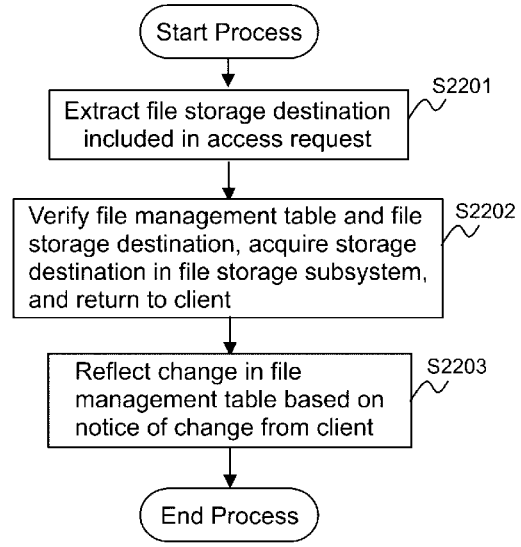
FIG. 22 is a flowchart showing an operation of file access processing via a reception program of a metadata server subsystem.

FIG. 22 is a flowchart showing an operation of the file access processing by a reception program of the metadata server subsystem.

In S2201, the reception program of the file system program 2213 of the metadata server subsystem 22 retrieves the file storage destination included in the file access request from the client 21. The file access request from the client 21 is performed by executing S2101 of FIG. 21.

In S2202, the reception program verifies the file management table 90 and the file storage destination, acquires the storage destination in the file storage subsystem 23, and returns the storage destination information to the client 21. According to the present process, the file sharing program 2511 of the client 21 is capable of "acquiring the storage destination in the file storage subsystem 23" in S2101.

In S2203, the reception program reflects the contents of change notice to the file management table 90 based on the change noticed from the client (S2103 of FIG. 21).

<Reception Program of File Storage Subsystem>

FIG. 23 is a flowchart showing the operation of file access processing according to the reception program of the file storage subsystem.

In S2301, the reception program of the file system program 2313 of the file storage subsystem 23 confirms the contents of the request of file access processing. The reception program executes S2302 if the request is "read", executes S2303 if the request is "write", and executes S2305 if the request is other than the above (that is, copy or delete).

In S2302, the reception program acquires the file data based on the block address 1004 stored in the file management table 100, and returns the same to the request source.

If the file data is stubbed, the reception program recalls the file data from the archive subsystem 27, and after storing the same in the LU of the file storage subsystem 23, returns the file data to the client 21 being the request source.

If the file data is not migrated, the reception program acquires the file data from the old NAS device 29, and after storing the same in the LU of the file storage subsystem 23, returns the file data to the client 21 being the request source.

In S2303, the reception program stores the write file data to be written in the LU of the file storage subsystem 23 according to the block address 1004 in the file management table 100.

If the file data is stubbed, the reception program recalls the file data from the archive subsystem 27, and after storing the same in the LU of the file storage subsystem 23, overwrites the data.

In S2304, the reception program adds the file name to the update list. Further, the update list is used in the synchronization request after replication is performed, and based on the update list, the file data to be matched between the file data in the file storage subsystem 23 and the file data in the archive subsystem 27 is specified.

In S2305, the reception program confirms the contents of the request of file access processing. The reception program executes S2306 if the request is "copy", and executes S2308 if the request is "delete".

If the request is "copy", in S2306, the reception program copies the file entity (data block) and the file management information (such as the inode management table or the file management table). If the file is stubbed, the reception program executes copying after recalling the file data from the archive subsystem 27.

In S2307, the reception program adds the file name having been copied to the update list.

If the request is "delete", in S2308, the reception program deletes the file management information of the file entity, and in S2307, the reception program adds the deleted file name to the update list.

<Data Mover Program of File Storage Subsystem>

Figure 24:
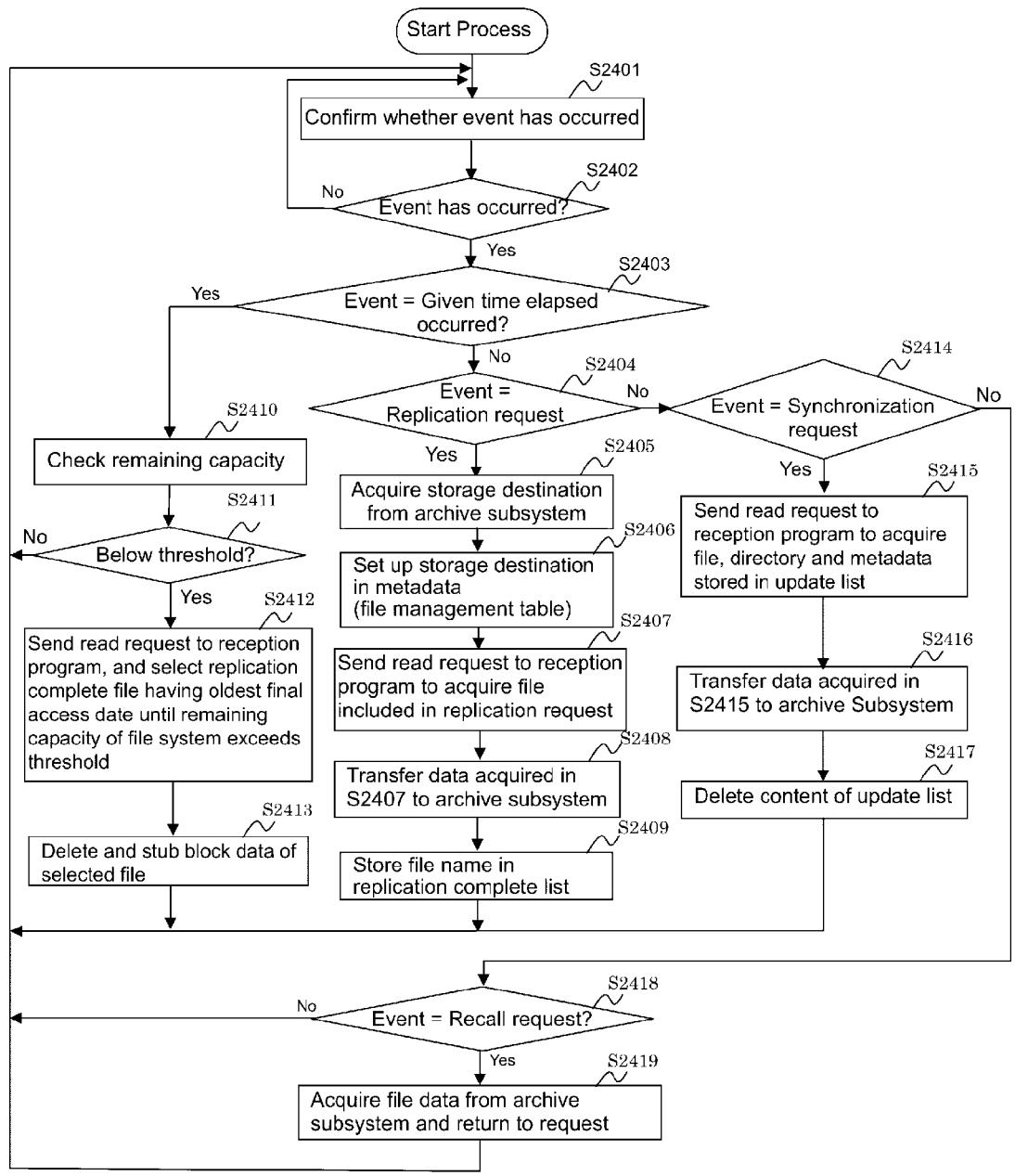
FIG. 24 is a flowchart showing the operation of file access processing via a data mover program of a file storage subsystem.

FIG. 24 is a flowchart showing the operation of file access processing via the data mover program of the file storage subsystem.

In S2401, the data mover program 2512 of the file storage subsystem 23 confirms the occurrence of an event (such as the elapse of a certain time/replication/synchronization request/recall request).

In S2402, the determination of confirmation of occurrence of an event is performed, and when an event has not occurred (S2402: No), the data mover program 2512 executes S2401 again.

When an event has occurred (S2402: Yes), the data mover program 2512 executes S2403.

In S2403, the data mover program 2512 determines whether the event that has occurred is "given time elapsed" or not.

If the event that has occurred is "given time elapsed" (S2403: Yes), the data mover program 2512 executes S2410, and if the event that has occurred is not "given time elapsed" (S2403: No), the program executes S2404.

In S2404, the data mover program 2512 determines whether the event that has occurred is "replication request" or not.

If the event that has occurred is "replication request" (S2404: Yes), the data mover program 2512 executes S2405, and if the event that has occurred is not "replication request" (S2404: No), the program executes S2414.

In S2405, the data mover program 2512 acquires the storage destination information of the file data in the archive subsystem 27 from the archive subsystem 27.

In S2406, the data mover program 2512 sets up the storage destination information in the metadata (file management table 100).

In S2407, in order to acquire the file included in the replication request, the data mover program 2512 sends a read request to the replication program in the file system program 2513 of the file storage subsystem 23.

In S2408, the data mover program 2512 transfers the file data acquired in S2407 to the archive subsystem 27.

In S2409, the data mover program 2512 records the file name in a replication complete list. After executing S2409, the data mover program 2512 re-executes the processes of S2401 and thereafter.

If the event that has occurred is "given time elapsed" (S2403: Yes), the data mover program 2512 checks the remaining capacity of the file system in S2410.

In S2411, the data mover program 2512 determines whether the remaining capacity of the file system has dropped below a threshold or not. If the capacity is not below the threshold (S2411: No), the data mover program 2512 re-executes the processes of S2401 and thereafter. If the capacity is below the threshold (S2411: Yes), the data mover program 2512 executes the process of S2412.

In S2412, the data mover program 2512 executes a read request to the reception program, and selects replication complete files starting from the file having the oldest final access date until the remaining capacity of the file system exceeds the threshold.

In S2413, the data mover program 2513 deletes the block data of the selected file, and performs stubbing. After executing S2413, the data mover program 2512 re-executes the processes of S2401 and thereafter.

If the event that has occurred in S2404 is not "replication request" (S2404: No), the data mover program 2512 determines whether the event that has occurred in S2414 is "synchronization request" or not.

If the event that has occurred is "synchronization request" (S2414: Yes), the data mover program 2512 executes S2415, and if the event that has occurred is not "synchronization request" (S2414: No), the program executes S2418.

In S2415, the data mover program 2512 sends a read request to the reception program so as to acquire the file, the directory and the metadata (file management table 100) stored in the update list.

In S2416, the data mover program 2512 transfers the acquired file—directory information and the metadata (file management table 100) to the archive subsystem 27.

In S2417, the data mover program 2512 deletes the file—directory information transferred to the archive subsystem 27 and the contents of the portion of the update list corresponding to the metadata. After executing S2417, the data mover program 2512 re-executes the processes of S2401 and thereafter.

In S2414, if the event that has occurred is not a "synchronization request" (S2414: No), the data mover program 2512 determines whether the event that has occurred in S2418 is a "recall request" or not.

If the event that has occurred is a "recall request" (S2418: Yes), the data mover program 2512 acquires the file data from the archive subsystem 27 in S2419, and sends the acquired file data to the file storage subsystem of the acquisition request source. If the event that has occurred is not a "recall request" (S2418: No), the processes of S2401 and thereafter are re-executed. After executing S2419, the data mover program 2512 re-executes the processes of S2401 and thereafter.

<Periodic Load Distribution Monitoring Process>

Figure 25:
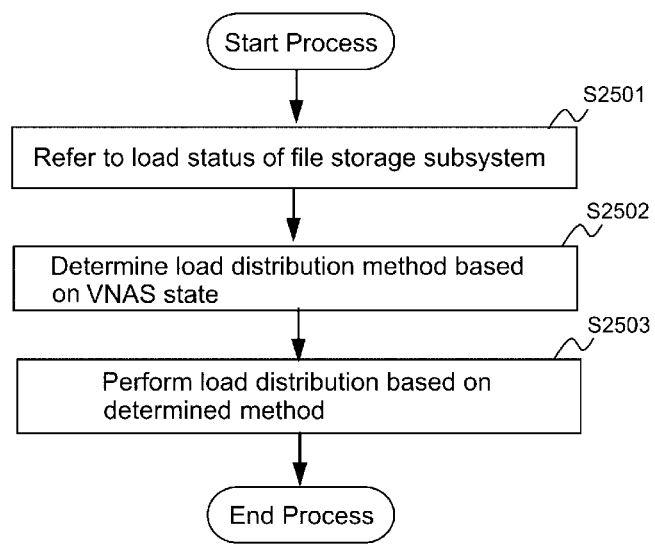
FIG. 25 is a flowchart showing the operation of periodic load distribution monitoring process.

FIG. 25 is a flowchart showing the operation of a periodic load distribution monitoring process. In the following description, for convenience, the subject of the processes will be the CPU of the file storage subsystem. However, the VNAS itself or multiple VNAS can execute the process, or a supervisor VNAS (S-VNAS) can be determined and the supervisor VNAS can execute the process. Even further, the virtualization control program 2391 operating on the CPU of the file storage subsystem 23 can execute the processes.

In S2501, the CPU refers to the load status (such as VNAS states, progress level of data migration and file access request frequency) of the file storage subsystem 23.

In S2502, the CPU determines the load distribution method described with reference to FIGS. 18A to 18D by the status or load of each VNAS.

In S2503, the CPU uses the load distribution method determined in S2502 to perform load distribution of each VNAS or the whole file storage subsystem.

<Load Distribution Processing of VNAS (S10)>

Figure 26:
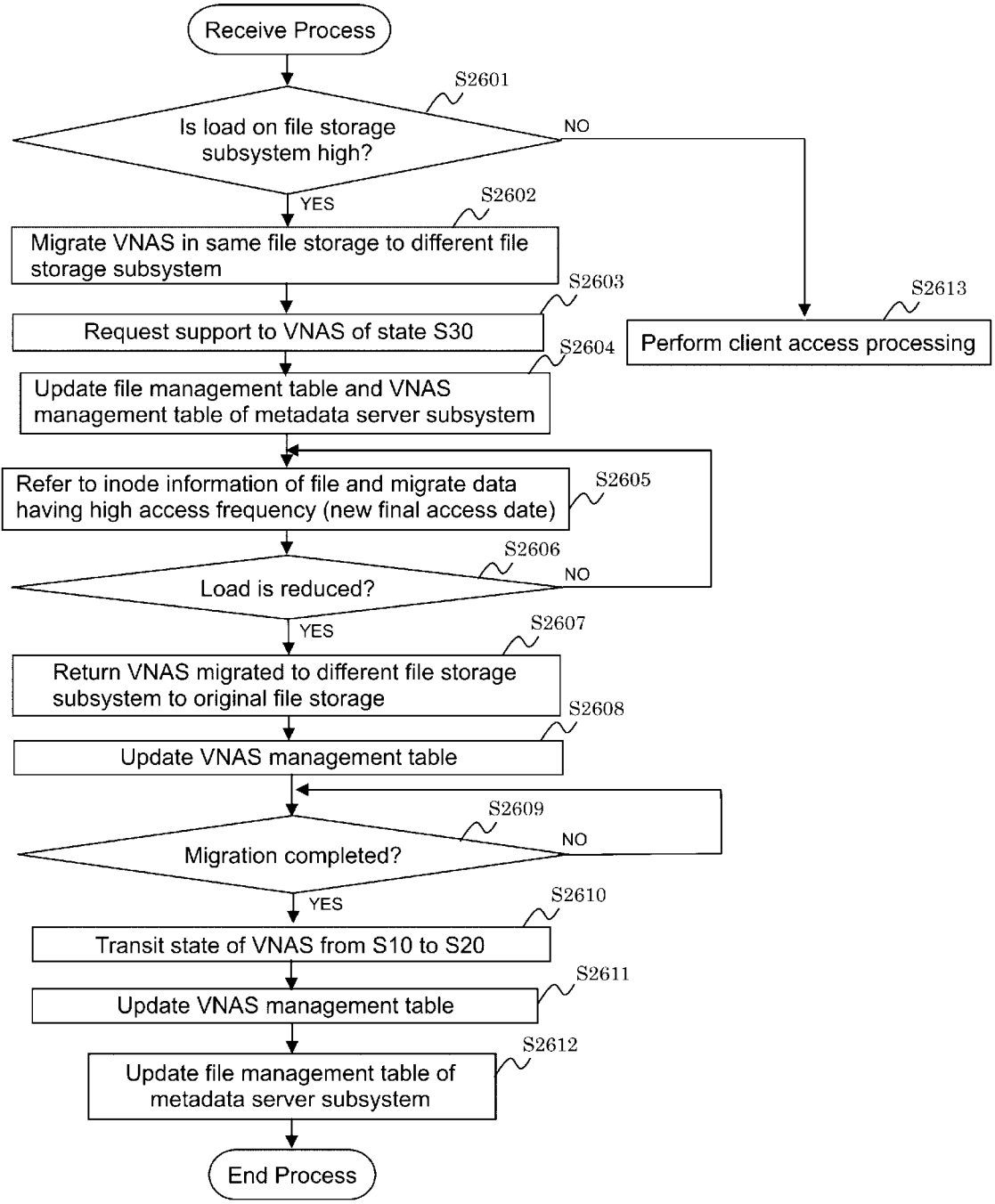
FIG. 26 is a flowchart showing a load distribution processing of VNAS in state S10.

FIG. 26 is a flowchart showing a load distribution processing of the VNAS in state S10.

In S2601, the CPU determines whether the load of the file storage subsystem 23a is high or not. If the load of the file storage subsystem 23a is not high (S2601: No), the VNAS (S10) performs a normal client access processing (S2613). If the load of the file storage subsystem 23a is high (S2601: Yes), the CPU executes the processes of S2602 and thereafter.

In S2602, the CPU migrates the VNAS (S10) in the file storage subsystem 23a to another file storage subsystem 23b.

In S2603, the CPU sends a support request to the VNAS (S30) in state S30. Then, the CPU executes migration of file data having a low access frequency via the VNAS (S11) having its status changed from S30 to S11.

In S2604, the CPU updates the file management table 90 and the VNAS management table 150 of the metadata server subsystem 22 so as to reflect the result of execution from S2602 to S2603.

In S2605, the CPU refers to the inode information of the file to specify the file data having a high access frequency (file having a new final access date), and causes the VNAS (S10) to execute data migration.

In S2606, the CPU determines whether the load of the file storage subsystem 23a has dropped or not based on the migration of file data by the VNAS (S10) and the VNAS (S11). If the load has not dropped (S2606: No), the CPU re-executes S2605.

If the load has dropped (S2606: Yes), in S2607, the CPU returns the VNAS (S10) migrated to the file storage subsystem 23b to the file storage subsystem 23a.

In S2608, the CPU updates the contents of the VNAS management table 150. That is, the CPU performs update so that the execution location 1502 of VNAS will be the file storage subsystem 23a of the migration source.

In S2609, the CPU determines based on the progress level whether migration of file data has been completed or not. If migration is not completed (S2609: No), the CPU re-executes the determination on whether migration is completed or not until the migration is completed. If the progress level reaches 100% and migration is completed (S2609: Yes), the process of S2610 is executed.

In S2610, the CPU executes state transition of the state of the VNAS from S10 (VNAS (S10)) to S20 (VNAS (S20)) since the progress level has reached 100% and migration has been completed.

In S2611, the CPU updates the state 1503 of the VNAS to "S20" in the VNAS management table 150.

In S2612, the CPU updates the file management table 90 of the metadata server subsystem 22, and updates the storage information of the file data from "file storage subsystem 23b" to "file storage subsystem 23a".

As described, by migrating the VNAS (S10) to another file storage subsystem to enable scale-up, and performing migration support of file data having a low access frequency (file having an old final access date) via VNAS (S11), it becomes possible to realize load distribution and enhance access performance of the file storage subsystem.

<Load Distribution Processing Via VNAS (S20)>

Figure 27:
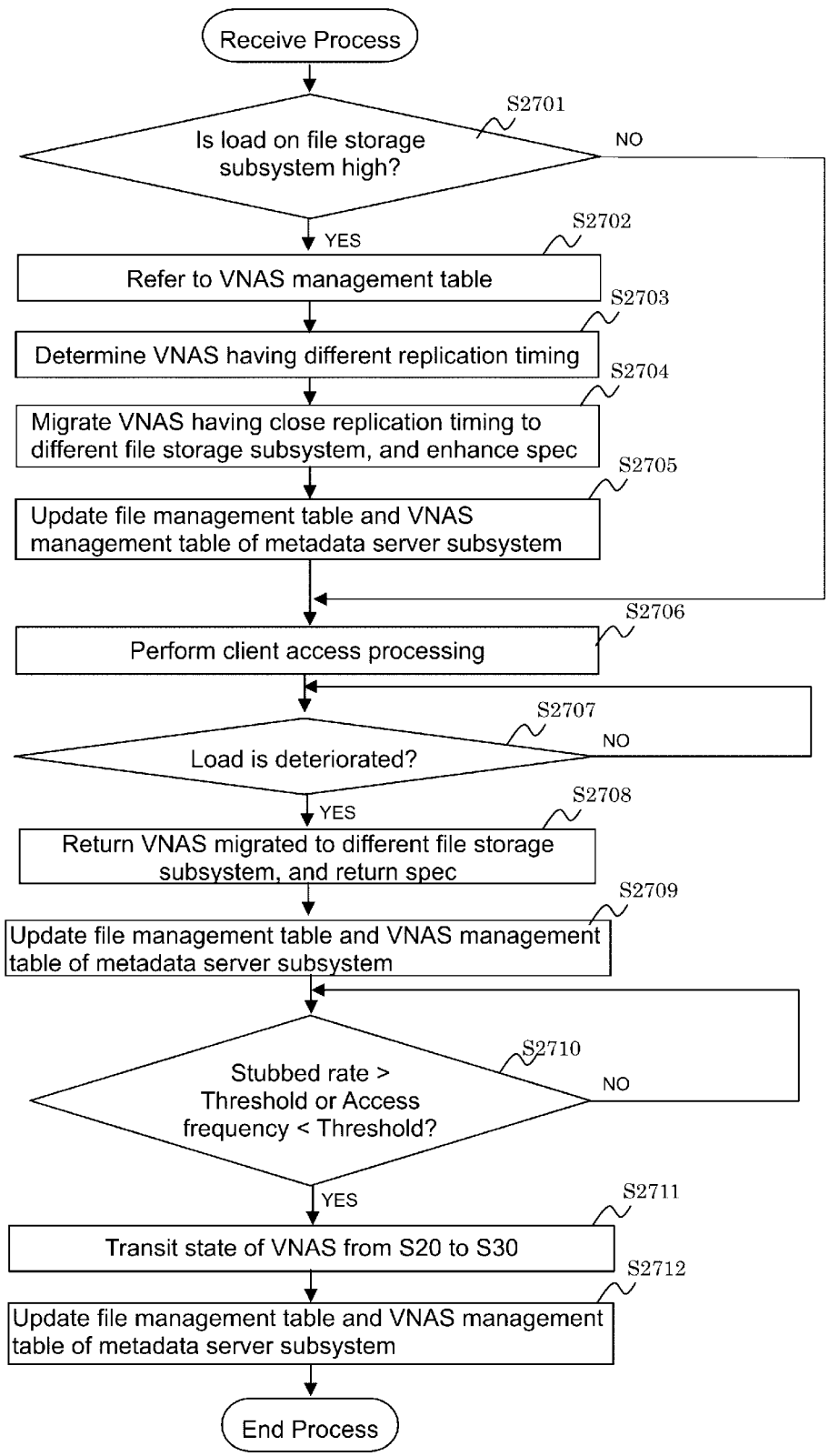
FIG. 27 is a flowchart showing a load distribution processing of VNAS in state S20.

FIG. 27 is a flowchart showing a load distribution processing of VNAS in state S20.

In S2701, the CPU determines whether the load of the file storage subsystem 23a is high or not. If the load of the file storage subsystem 23a is not high (S2701: No), the VNAS (S20) performs a normal client access processing (S2706). If the load of the file storage subsystem 23a is high (S2701: Yes), the processes of S2702 and thereafter are executed by the CPU.

In S2702, the CPU refers to a replication/synchronization time 1508 in the VNAS management table 150.

In S2703, the CPU specifies the VNAS (S20) close to the VNAS (S20) having a different replication timing from the replication/synchronization time 1508 of each VNAS (S20) being referred to.

In S2704, the CPU migrates the VNAS (S20) having a close replication timing to a different file storage subsystem 25b, and enhances the specification (scale-up). In this case, it is also possible to subject the VNAS (S20) not being migrated to the resource used by the migrated VNAS (S20).

In S2705, the CPU updates the file management table 90 and the VNAS management table 150 of the metadata server subsystem 22 so that the result of execution of S2703 and 2704 is reflected.

In S2706, the VNAS (S20) performs a client access processing.

In S2707, the CPU determines whether the load of the file storage subsystem 23a has been reduced or not. If the load has not been reduced (S2707: No), the CPU re-executes S2707.

If the load has been reduced (S2707: Yes), the CPU returns the VNAS (S20) migrated to the file storage subsystem 23b to the file storage subsystem 23a in S2708, subjects the VNAS to scale-down and returns the specification thereof to that before migration.

In S2709, the CPU updates the file management table 90 and the VNAS management table 150 of the metadata server subsystem 22 so that the result of processes of S2707 and S2708 is reflected.

In S2710, the CPU determines whether the stubbed rate STB (number of files being stubbed/total number of files) has exceeded a predetermined threshold SB_th1, or the access frequency has dropped below a predetermined threshold IO_th1. If both conditions are not satisfied (S2710: No), the CPU repeats the process of S2710 until the conditions are satisfied.

If either one of the conditions is satisfied (S2710: Yes), in S2711 the state of the VNAS is transited from S20 to S30 and the VNAS (S20) becomes VNAS (S30), and the VNAS is subjected to scale-down based on the VNAS spec policy table 160.

In S2712, the CPU updates the file management table 90 and the VNAS management table 150 of the metadata server subsystem 22.

As described, by specifying the VNAS (S20) having a different replication timing, migrating the specified VNAS (S20) to a different file storage subsystem, and subjecting the VNAS to scale-up, it becomes possible to realize load dispersion and enhance access performance of the file storage subsystem.

<Load Distribution Processing of VNAS (S30)>

Figure 28:
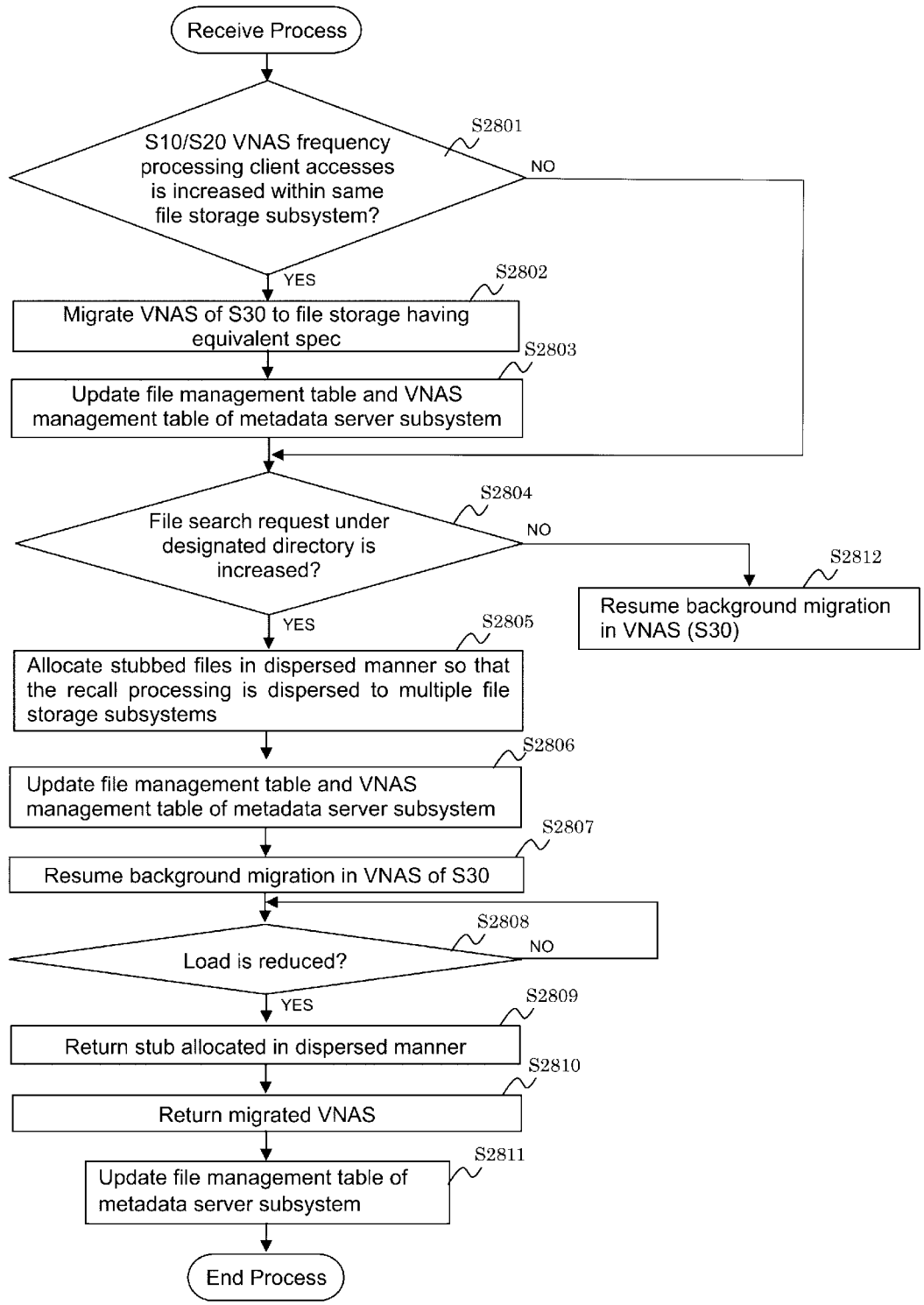
FIG. 28 is a flowchart showing a load distribution processing of VNAS in state S30.

FIG. 28 is a flowchart showing a load distribution processing of a VNAS in state S30.

In S2801, the CPU determines whether the number of VNAS (S10) or VNAS (S20) frequently processing file accesses from the client 21 within the same file storage subsystem 23a has increased or not. If the number has not increased (S2801: No), the CPU executes S2803. If the number has increased (S2801: Yes), the CPU determines that load distribution is necessary, and executes the processes of S2802 and S2803.

In S2802, the CPU searches for a different file storage subsystem capable of acquiring an equivalent specification as the VNAS (S30) in state S30. Then, the CPU migrates the VNAS (S30) to the found file storage subsystem 23b after stopping the migration processing that had been executed by the VNAS (S30) in the background.

In S2803, the CPU updates the file management table 90 and the VNAS management table 150 in the metadata server subsystem 22.

In S2804, the CPU determines whether the file search request under the designated directory has increased or not.

If it is determined that the file search request under the designated directory has not increased (S2804: No), the CPU resumes file data migration in the background by the VNAS (S30) (S2812).

If it is determined that the file search request under the designated directory has increased (S2804: Yes), the CPU executes the processes of S2805 and thereafter. This is to perform load distribution in advance since overload status of the file storage subsystem may be caused when file search requests are increased.

In S2805, the CPU allocates the link information of the stubbed file in distributed manner to a plurality of file storage subsystems. Thus, it becomes possible to process the recall processing via a plurality of file storage subsystems simultaneously and to realize load distribution.

In S2806, the CPU updates the file management table 90 and the VNAS management table 150 in the metadata server subsystem 22.

In S2807, the CPU resumes background migration of file data in VNAS (S30).

In S2808, the CPU determines whether the load of the file storage subsystem 23a has been reduced or not. If the load has not been reduced (S2808: No), the CPU re-executes S2808.

If the load has been reduced (S2807: Yes), the CPU returns the VNAS (S20) having been migrated to the file storage subsystem 23b to the file storage subsystem 23a in S2808, and subjects the VNAS to scale-down so as to return the specification to the specification before migration.

In S2809, the CPU returns the link information which is the stubbing information arranged in distributed manner to a plurality of file storages to the file storage subsystem 23a. The information can remain distributed, or can be returned after a given time has elapsed.

In S2810, the CPU returns the VNAS (S30) migrated to the file storage subsystem 23b to the file storage subsystem 23a.

In S2811, the CPU updates the file management table 90 of the metadata server subsystem 22.

As described, by migrating the VNAS (S30) to a different file storage subsystem and distributing the recall processing via distributed arrangement of the stubbing information in a plurality of file storage subsystems, it becomes possible to realize load distribution and enhance access performance of the file storage subsystem even when a large amount of recall processing has occurred.

<Load Distribution Support Processing in VNAS (S11)>

Figure 29:
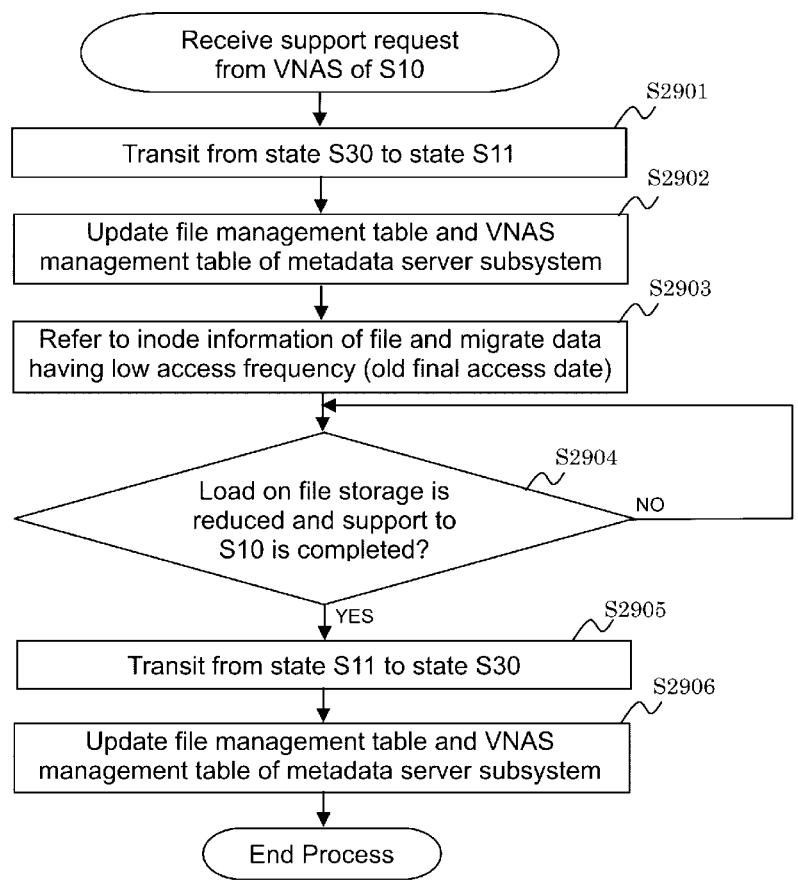
FIG. 29 is a flowchart showing a load distribution support processing of VNAS in state S11.

FIG. 29 is a flowchart showing a load distribution support processing by the VNAS in state S11. The present processing is started when the VNAS (S30) receives a support request from the VNAS (S10).

In S2901, the CPU transfers the state of VNAS (S30) to VNAS (S11).

In S2902, the CPU updates the file management table 90 and the VNAS management table 150 of the metadata server subsystem 22.

In S2903, the VNAS (S11) refers to the inode information of the file data (inode management table 70), and executes migration of file data having a low access frequency (file having an old final access date) from the old NAS device 29.

In S2904, the CPU determines whether the load of the file storage subsystem has been reduced and the supporting to the VNAS (S10) has completed based on the progress level.

When it is not determined that supporting is completed (progress level 100%) (S2904: No), the CPU repeats the process of S2904.

When it is determined that supporting is completed (progress level 100%) (S2904: Yes), the CPU changes the state of the VNAS (S11) to the state of S30 in S2905, and returns the VNAS (S11) to VNAS (S30).

In S2906, the CPU updates the file management table 90 and the VNAS management table 150 of the metadata server subsystem 22.

As described, by supporting migration of the file data having a low access frequency (file having an old final access date) by VNAS (S11), it becomes possible to realize load distribution and enhance access performance of the file storage subsystem.

<Load Distribution Processing in Archive Subsystem>

Figure 30:
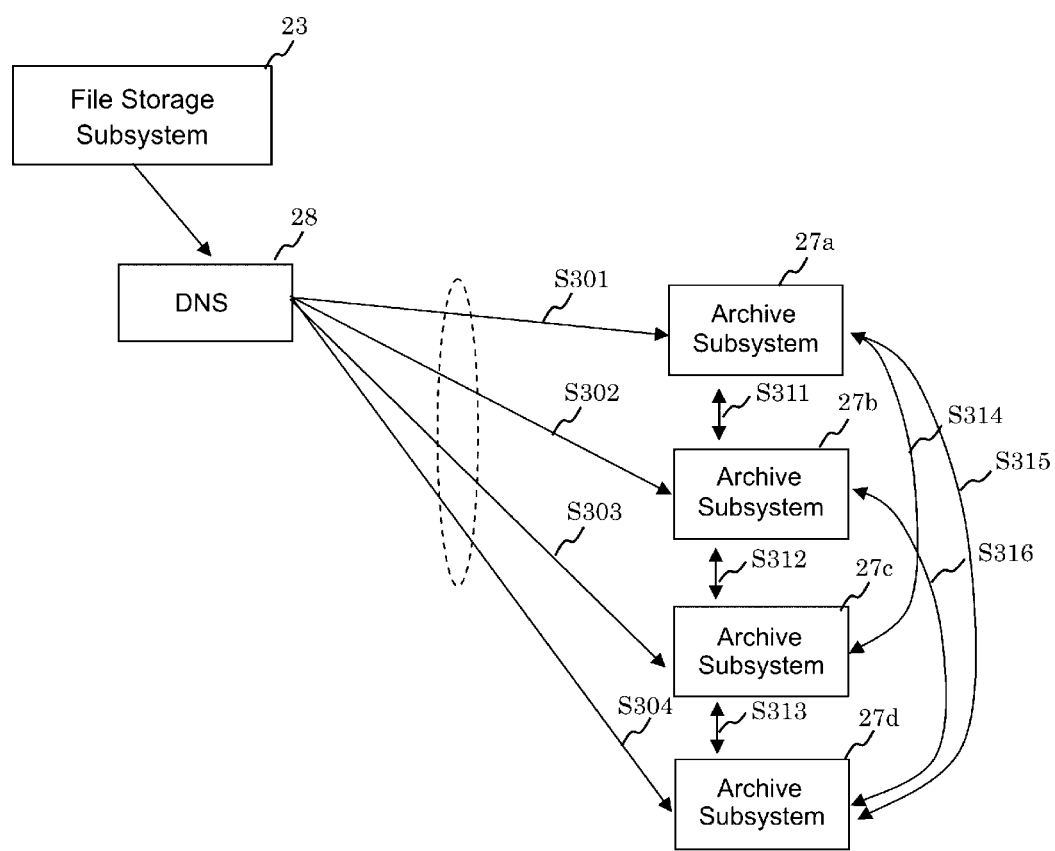
FIG. 30 is a view showing an operation of load distribution processing in an archive subsystem.

FIG. 30 is a view showing the operation of load distribution processing in an archive subsystem. The present load distribution processing is aimed at preventing concentration of accesses (concentration of accesses via recall processing or the like) to a single archive subsystem.

Actually, the DNS (Domain Name System) server is arranged between the file storage subsystem 23 and archive subsystems 27a through 27d. The file data from the file storage subsystem 23 is written sequentially via the DNS server into archive subsystems 27a through 27d in round-robin fashion (S301 to S304).

Next, the written file data is copied among archive subsystems 27 so that the same file data exists in all archive subsystems 27. For example, after file data A is written into the archive subsystem 27b from the DNS server, the file data A is written into the archive subsystem 27a via synchronous copy operation S311, into the archive subsystem 27c via copy operation S312, and into the archive subsystem 27d via copy operation S316.

As described, since file data A exists in all archive subsystems, the file data A can be read immediately from the archive subsystem in process standby when a read request of file data A occurs.

As described, by storing the file data in round-robin fashion and performing synchronous copy of the data in the archive subsystems 27, it becomes possible to realize load distribution and enhance access performances.

As described, by executing the load distribution system for each VNAS state, it becomes possible to realize load distribution and enhance access performance of a file storage subsystem and a file storage system composed of an archive subsystem coupled to the file storage subsystem.

Preferred embodiments of the present invention have been illustrated, but the embodiments are merely illustrated for better understanding of the present invention, and they are not meant to restrict the scope of the present invention in any way. The present invention can be realized via other various modified examples.

The file storage subsystem or the RAID system can be other types of storage devices. Moreover, the storage areas in which the files are stored are not restricted to LUs.

A portion of a configuration of a certain embodiment can be replaced with a configuration of another embodiment, or a configuration of a certain embodiment can be added to the configuration of another embodiment. In addition, another configuration can be added to, deleted from or replaced with a portion of the configuration of each embodiment.

Further, a portion or all of each configuration, function, processing unit and processing means in the present description can be realized via a hardware such as the design of an integrated circuit. Moreover, each configuration, function and the like mentioned above can be realized via a software capable of interpreting the program for realizing the respective functions and executing the program.

The information such as the programs, tables and files for realizing the respective functions can be stored in a memory device such as a memory, a hard disk or a SSD (Solid State Drive), or in a memory media such as an IC card, an SD card or a DVD.

The control lines and information lines illustrated in the drawings are merely illustrated for sake of explanation, and not necessary all the control lines and information lines required for manufacture are illustrated. Actually, substantially all the components can be considered to be mutually connected.

REFERENCE SIGNS LIST

2a Edge
2b Core
16, 17, 18 Data migration
21, 21a, 21b, 21c Client
22 Metadata server subsystem
23, 23a, 23b, 23c File storage subsystem
24 RAID system
25a, 25b, 25n VNAS
27 Archive subsystem
28 DNS (Domain Name System) server
29 Old NAS device
40 File system (FS)
50, 60 Inode
61 Storage destination address
62 Data block
70, 71, 72 inode management table
90, 100 File management table
150 VNAS management table
160 VNAS spec policy table
170 VNAS state transition table
201, 202, 203, 204 File management table
211, 231, 271 Memory
212, 232, 272 CPU
213, 233, 273 NIC (Network Interface Card)
214, 244 Disk
235, 275 HBA (Host Bus Adapter)
241 LU
242 Controller
242a, 242b, 242c, 242d, 242e, 242f LU
245 CHA (Channel Adapter)
250a, 250b, 250c, 250d, 250e, 250f VNAS
251a, 251b, 251c, 251d, 251e, 251f FS
2315, 2715 Application
2211, 2311, 2511 File sharing program
2212, 2512, 2712 Data mover program
2213, 2313, 2513, 2713 File system program
2214, 2314, 2514, 2714 Kernel/driver
2391 Virtualization control program
2511a File
2716 Archive program
2711a File

The invention claimed is:

1. A file storage system comprising:
an edge comprising a local system including a local storage device for storing data and one or more file storage subsystems, which manages the local storage device, coupled to one or more clients and one or more old Network Attached Storage (NAS) devices,
a core comprising a remote system configured to provide bases and cloud services for collectively managing servers and storage devices, wherein the core includes an archive system including a remote storage device for storing data and an archive subsystem for managing the remote storage devices, wherein the archive subsystem includes a central processing unit (CPU), a network interface card (NIC), and a host bus adapter (HBA), wherein the NIC is configured to communicate with the one or more clients and the one or more old NAS devices, and wherein the edge and the core are coupled via a network configured to communicate file data between the local system and the archive subsystem, wherein the one or more file storage subsystems are configured to:
   store, in the local storage device, data of files received from the one or more clients;
   replicate the files to the archive subsystem;
   stub one or more files stored in the local storage device; and
   upon receiving an access request from the one or more clients, read out data of a file related to the access request from the local storage device and transmit the data to the one or more clients if the file is not stubbed, acquire and recall data of a file related to the access request from the archive subsystem and transmit data of the file to the one or more clients if the file is stubbed, wherein the one or more file storage subsystems are configured to manage a plurality of virtual computers including a first virtual computer and a second virtual computer;

wherein, when data in the old NAS device is migrated to the local system, the first virtual computer is configured to:
   receive first data having high access frequency from the old NAS device;
   receive access request from the clients during receiving the migrated data from the old NAS devices; and
   replicate the first data to the archive subsystem, wherein the replicated first data is shared with the edge and the core,
   allocate storage area for the replicated first data based on the access request, the second virtual computer is configured to:
   receive second data having low access frequency from the old NAS device; and
   replicate the second data to the archive subsystem.

2. The file storage system according to claim 1, wherein
a virtual computer is caused to execute one or more of the following operations:
   a first file data access from the old NAS to the local system;
   a second file data access between the client device and the local system; and
   a third file data access between the local system and the archive system, and
a virtual computer managing the file data has the following states:
   a first state for executing first file data access and second file data access;
   a second state for executing the second file data access;
   a third state for executing the second file data access and the third file data access; and
   a fourth state for executing the first file data access performed by the virtual computers in the first state.

3. The file storage system according to claim 2, wherein
an allocated processor and memory are changed according to the state of the virtual computer or the amount of access of the file data.

4. The file storage system according to claim 3, wherein
transition of the virtual computer to the first state is executed by creating a new virtual computer by the file storage subsystem.

5. The file storage system according to claim 3, wherein
the virtual computer in the second state is transited from the virtual computer in the first state when the first file data access from the old NAS device to the file storage subsystem is completed.

6. The file storage system according to claim 3, wherein
the virtual computer in the third state is transited from the virtual computer in the second state when an access frequency to the managed file data is below a given threshold or a number of file data migrated to the archive system is greater than a given threshold number.

7. The file storage system according to claim 3, wherein
the virtual computer in the fourth state is transited from the virtual computer in the third state based on a request for supporting migration of file data from the virtual computer in the first state, and when the migration of file data is completed, the virtual computer in the third state is transited to the virtual computer in the fourth state.

8. The file storage system according to claim 4, wherein
the virtual computer in the first state is migrated to a file storage subsystem that differs from said file storage subsystem to process file accesses from the client device, and the migration of file data is executed by the virtual computer in the fourth state.

9. The file storage system according to claim 5, wherein
the virtual computer in the second state is migrated from the file storage subsystem to the file storage subsystem in which a time for processing replication of file data to the archive subsystem differs; and
the file access from the client device and the file data replication processing are executed.

10. The file storage system according to claim 6, wherein
the state of the virtual computer in the third state is transited to the virtual computer in the fourth state based on a request to support migration of file data from the virtual computer in the first state; and
the virtual computer in the fourth state executes migration of the file data.

11. The file storage system according to claim 5, wherein
the state of the virtual computer in the first state or the state of the virtual computer in the second state processing the file accesses from the client device are monitored by a third virtual computer; and
if the first or second virtual computer is increased, the third virtual computer is migrated to a different file storage subsystem and migration of file data is executed.

12. The file storage system according to claim 1, wherein
the file data of the file storage subsystem in the local system is migrated to the archive subsystem;
reference information of the file data to the archive subsystem is stored in the file storage subsystem; and
the reference information is stored in distributed manner to each file storage subsystem.

13. The file storage system according to claim 1, wherein
the file data of the archive system is sequentially stored in round-robin fashion to the archive subsystem, and the file data having been stored is replicated from the archive subsystem in which storage of data is completed to a different archive subsystem.

14. A load distribution method of a file storage system comprising:
- an edge comprising a local system including a local storage device for storing data and one or more file storage subsystems for managing the local storage device, coupled to one or more clients and one or more old Network Attached Storage (NAS) devices,
- a core comprising a remote system configured to provide bases and cloud services for collectively managing servers and storage devices, wherein the core includes an archive system including a remote storage device for storing data and an archive subsystem for managing the remote storage devices, wherein the archive subsystem includes a central processing unit (CPU), a network interface card (NIC), and a host bus adapter (HBA), wherein the NIC is configured to communicate with the one or more clients and the one or more old NAS devices, and wherein the edge and the core are coupled via a network configured to communicate
- file data between the local system and the archive subsystem, the method comprising:

the one or more file storage subsystems:
- storing, in the local storage device, data of files received from the one or more clients;
- replicating the files to the archive subsystem;
- stubbing the one or more files stored in the local storage device; and
- upon receiving an access request from the one or more clients, reading out data of a file related to the access request from the local storage device and transmitting the data to the one or more clients if the file is not stubbed, acquiring and recalling data of a file related to the access request from the archive subsystem and transmitting data of the file to the one or more clients if the file is stubbed, wherein the one or more file storage subsystems for managing a plurality of virtual computers including a first virtual computer and a second virtual computer;

wherein, when data in the old NAS device is migrated to the local system, the first virtual computer:
- receiving first data having high access frequency from the old NAS device;
- receiving access request from the clients during receiving the migrated data from the old NAS devices; and
- replicating the first data to the archive subsystem, wherein the replicated first data is shared with the edge and the core,
- allocating storage area for the replicated first data based on the access request, the second virtual computer:
- receiving second data having low access frequency from the old NAS device; and
- replicating the second data to the archive subsystem.

* * * * *